(12) United States Patent
Russell et al.

(10) Patent No.: US 7,671,751 B2
(45) Date of Patent: Mar. 2, 2010

(54) SYSTEM AND METHOD FOR CONDUCTING PET DEATH, AND OTHER PET RELATED TRANSACTIONS OVER A COMPUTER NETWORK

(75) Inventors: Katharine Russell, San Francisco, CA (US); Sally Willis Rogers, Bel Air, MD (US); Dale L. Johnson, San Francisco, CA (US)

(73) Assignee: MyEtribute, Inc., Palm Desert, CA (US)

( * ) Notice: Subject to any disclaimer, the term of this patent is extended or adjusted under 35 U.S.C. 154(b) by 1706 days.

(21) Appl. No.: 10/001,420

(22) Filed: Nov. 1, 2001

(65) Prior Publication Data

US 2002/0178079 A1 Nov. 28, 2002

Related U.S. Application Data

(60) Provisional application No. 60/245,499, filed on Nov. 3, 2000, provisional application No. 60/245,500, filed on Nov. 3, 2000, provisional application No. 60/245,501, filed on Nov. 3, 2000, provisional application No. 60/245,502, filed on Nov. 3, 2000, provisional application No. 60/265,137, filed on Jan. 29, 2001.

(51) Int. Cl.
G08B 23/00 (2006.01)
G06Q 30/00 (2006.01)

(52) U.S. Cl. ............ 340/573.3; 119/174; 705/16; 705/26

(58) Field of Classification Search ............ 705/26–28, 705/7, 8, 10, 16, 30; 707/1, 10, 100; 340/573.3; 119/174

See application file for complete search history.

(56) References Cited

U.S. PATENT DOCUMENTS

| | | | | |
|---|---|---|---|---|
| 5,341,548 | A | | 8/1994 | Zerick ........................... 27/28 |
| 5,659,933 | A | | 8/1997 | McWilliams ................... 27/28 |
| 5,691,157 | A | * | 11/1997 | Gong et al. ................. 435/7.25 |
| 6,052,877 | A | | 4/2000 | Richard ........................... 27/1 |
| 6,208,974 | B1 | * | 3/2001 | Campbell et al. .............. 705/3 |
| 6,218,122 | B1 | * | 4/2001 | Friend et al. ................... 435/6 |
| 6,276,533 | B1 | * | 8/2001 | Kaplan ....................... 206/534 |
| 6,287,254 | B1 | * | 9/2001 | Dodds ........................ 600/300 |
| 6,358,546 | B1 | * | 3/2002 | Bebiak et al. ................ 426/232 |
| 6,401,095 | B1 | * | 6/2002 | Adler ........................... 707/10 |
| 6,576,280 | B2 | * | 6/2003 | Bebiak et al. ................ 426/232 |
| 6,581,073 | B1 | * | 6/2003 | Adler ......................... 707/200 |
| 6,581,773 | B2 | * | 6/2003 | Kaplan ....................... 206/534 |
| 6,604,018 | B2 | * | 8/2003 | Richard ....................... 700/225 |
| RE38,343 | E | * | 12/2003 | Bergman et al. ......... 340/573.1 |
| 6,669,975 | B1 | * | 12/2003 | Abene et al. ................ 426/302 |
| 6,671,697 | B1 | * | 12/2003 | Thibodeau ............... 707/104.1 |
| 6,730,023 | B1 | * | 5/2004 | Dodds ........................ 600/300 |

(Continued)

*Primary Examiner*—Andrew Joseph Rudy
(74) *Attorney, Agent, or Firm*—Albert P. Halluin; Daniel H. Zang; Wilson Sonsini Goodrich & Rosati

(57) ABSTRACT

A business method for conducting pet, death, DNA and other related transactions over a computer network is disclosed. A one-stop site on the Internet permits remote users to establish accounts, run user sessions, obtain information, and order pet, death, DNA and other related products and services from a variety of sources and vendors. The one-stop site performs multiple services that are ordinarily done by many both for the initial user and for subsequent related users that are referenced to the site. Charges for all transactions are made to user accounts and payments need only be made to the one-stop site.

12 Claims, 12 Drawing Sheets

U.S. PATENT DOCUMENTS

| | | | |
|---|---|---|---|
| 6,739,941 B1 * | 5/2004 | Brownsberger | 446/369 |
| 6,785,938 B1 * | 9/2004 | Johansen, Jr. | 27/1 |
| 6,792,465 B1 * | 9/2004 | Welsh | 709/229 |
| 6,845,382 B2 * | 1/2005 | Meadows | 707/104.1 |
| 6,886,740 B1 * | 5/2005 | Craig | 235/85 FC |
| 6,905,410 B2 * | 6/2005 | Kusuda et al. | 463/25 |
| 6,915,265 B1 * | 7/2005 | Johnson | 705/2 |
| 7,020,701 B1 * | 3/2006 | Gelvin et al. | 709/224 |
| 7,055,463 B2 * | 6/2006 | Welsh | 119/712 |
| 7,080,149 B1 * | 7/2006 | Welsh | 709/229 |
| 7,214,065 B2 * | 5/2007 | Fitzsimmons, Jr. | 434/236 |
| 7,222,120 B1 * | 5/2007 | Mindrum | 707/10 |
| 7,287,225 B2 * | 10/2007 | Mindrum | 715/716 |
| 7,319,970 B1 * | 1/2008 | Simone | 705/4 |
| 7,412,422 B2 * | 8/2008 | Shiloh | 705/74 |
| 7,418,437 B1 * | 8/2008 | Marks | 707/1 |
| 2002/0022772 A1 * | 2/2002 | Dodds | 600/300 |
| 2003/0065720 A1 * | 4/2003 | Chafer | 709/204 |

* cited by examiner

SYSTEM AND METHOD FOR CONDUCTING PET DEATH, AND OTHER PET RELATED TRANSACTIONS OVER A COMPUTER NETWORK

NOTICE OF PRIORITY

This application claims priority from each of U.S. Provisional Application Nos. 60/245,499, 60/245,500, 60/245,501, and 60/245,502, all filed on Nov. 3, 2000, and also from U.S. Provisional Application No. 60/265,137 filed on Jan. 29, 2001, each of the foregoing of which are commonly assigned and each of which are hereby incorporated herein in their entirety by reference.

FIELD OF THE INVENTION

The present invention relates generally to a system and method for conducting business over a computer network, and more specifically to system and method for conducting pet, death, DNA and other related transactions over the Internet.

BACKGROUND OF THE INVENTION

The U.S. pet market was $20 billion in 1999, according to the American Pet Products Manufacturers Association (APPMA). The APPMA estimates that 61 percent of U.S. households own pets and that 40 percent own more than one pet. 61 million U.S. households own 130 million pet dogs and cats, as well as birds, reptiles and other small animals. Many reasons are given for this broad-based pet ownership, with households that are likely to have pets including Baby Boomers, children and the elderly, who tend to have companion animals. Americans also are making pets more a part of their families. A 1996 study found that over 60 percent of pet owners give their pets a present at Christmas and that 20 percent leave a radio, TV or stereo on for the pet when away from home.

Pet spending is growing and the aging population is more likely to have the leisure time to have additional pets. Furthermore, caring for and about a pet is not limited to the true owner or guardian of a pet. Many others share in the duties and companionship of any particular pet, much like an extended family or social circle. A typical pet is considered to be a part of numerous lives, such that others would also consider the pet "theirs." People want to know more about how to care for their pets and the pets of others, what goods and services are available for these pets, and even what kind of pet might be the best for them.

Animals age at different rates. For example, a large dog, such as a mastiff, is considered "senior" at five years of age. Conversely, a small dog, such as a miniature dachshund, is not considered "senior" until it is about eight years old. This factor is significant in that age group specializations are now emerging as major practices in veterinary medicine. Veterinarians are being encouraged to offer age related pet programs, and many veterinarians now offer programs for "senior" and "geriatric" pets. Age related services, such as weight management programs and animal hospices, are growing with this trend. In addition, significant therapeutic products are now being offered by the pharmaceutical industry to treat age-related conditions in animals, such as arthritis and cognitive disorders. There are wide discrepancies, however, in age classifications between different pet species and breeds. There can even be discrepancies between different pets of the same breed depending upon individual circumstances such as geographic location, diet, lifestyle, and pet history. Because pet owners may want to know the proper age classification of their pet so as to be able to procure appropriate age related services, a need exists for convenient access to such individualized information.

People are very attached to their pet companions and want to commemorate their passing when that time comes. Often, a pet is a treasured member of the family and its loss is greatly felt. In households with no children, the pet often is viewed as a family member and mourned accordingly. Families with children need to help them mourn the death of a pet, and a first experience with death is often through the loss of a pet. Many people want closure when a pet that they know dies, but time constraints, travel limits and other duties can keep people from accomplishing this in person.

The emergence of the Internet has provided a new way for people to communicate with loved ones, friends and business acquaintances, and has also provided a convenient way to access information. The vast majority of Americans now have Internet access. Based on the projected population and pet ownership for 2001, there will be over 95 million Internet-connected pet owners during this year, nearly 27 million of whom will own mature pets. An opportunity has thus evolved to enable people to care for, learn about, and ultimately mourn the passing of their pet companions in new and fulfilling ways. Accordingly, a need exists for new and improved systems and methods for obtaining information and conducting transactions for and about pets through the use of computer networks and particularly Internet-based services.

In addition, the marketplace for human death and dying is a $30 billion industry in the United States. Funds in U.S. pre-need agreements to purchase funeral and burial goods and services totaled $25 billion in 1998 versus $18 billion in 1995. There were 2.3 million deaths in the United States in 1999 according to the U.S. Centers for Disease Control and Prevention, and the National Funeral Directors Association estimates that this figure will increase by 50 percent in the next 30 years. The death services business has been a slow-growth industry for many years, however, due to a lack of product innovation and consumer understanding.

With the aging demographics of the American public, many more people are involved in mourning the passing of parents, loved ones, friends and colleagues. The aging of America will bring a greater focus on how people commemorate the passing of their loved ones and plan for their own deaths. Modem life demands that people find new avenues to commemorate the passing of their loved ones, and many people today want to bring greater creativity, diversity and individuality to death-related rituals.

In the traditional model of mourning, people are nearby and hear about the passing from friends or in the local newspaper, such that it is easy to attend the funeral, learn the wishes of the family and communicate sympathy. Modem lifestyles make traditional models of mourning difficult, however, and mourning has become more challenging as the world has changed. Society has become increasingly mobile, such that families and friends no longer remain clustered in the same geographic area and often live at great distances from one another. Traditional models often fail now, as learning about the passing, knowing the wishes of the family and responding appropriately have become more complicated. Not only does the body often need to be transported to the burial site, but mourners must also gather from around the country and sometimes the world. Increasingly diverse cultures and environments result in foreign and different traditions for many co-workers and neighbors. People frequently feel a lack of process and closure as well as inadequate means of expressing their sympathy.

While emotions may be intense after the death of a loved one, many arrangements need to be made quickly. The individual responsible for making the funeral arrangements has several challenges. He or she must deal with short time frames, contact the mourning community, make the arrangements and decisions about the funeral home, church and catering, and communicate the wishes of the deceased. In the past, several family members could be relied upon to inform and assist, but now families typically are spread out, making it difficult to know what is required and to expedite the wishes of the deceased. People also can be frustrated by the lack of alternatives to traditional offerings.

Mourners who want to participate or express their sympathy have a set of challenges as well. First, they need to learn of the death soon enough to respond. Second, they need to know the wishes of the deceased. Third, they want to respond and do the "right" thing. And lastly, if the deceased is a co-worker or neighbor, the mourners may not know the religious or cultural traditions of the deceased. They may need more closure than circumstances permit and some may need additional services. In all four circumstances, the mourner's geographic location and degree of closeness to the family have tremendous impact on the mourner's ability to respond. Some individuals may want to plan ahead and may wish to be non-traditional, creative and more personal than traditional means allow. Such people may want to write their own tributes or record a video, and need a convenient place to store this information.

As the emergence of computer networks and particularly the Internet has provided a new way for people to communicate with loved ones, friends and business acquaintances, an opportunity has evolved to enable people to mourn the passing of individuals in new and fulfilling ways. Accordingly, a need exists for new and improved systems and methods of mourning the passing of individuals through the use of computer networks and particularly Internet-based services.

As a result of the Human Genome Project bringing national attention to the sequencing of the human genome, people have also become interested in having their DNA sequenced and stored. While research is being conducted on completed sequences, the prospect of doing disease susceptibility and hereditary studies is becoming more likely. People are interested in storing their DNA in order to have records of their genomes for identification and genetic testing. A significant percentage of the population is aware of uses for genetic information in identification and paternity testing. Moreover, the funeral services industry already has begun to collect posthumous samples. Technology has advanced to the point where samples can be collected from saliva and, after processing, be stored either on filter paper or in a minus-70-degree Celsius freezer. The samples can be returned to the family. As people are very attached to their pet companions, they want to learn about and store DNA information for them as well. In addition, the American Kennel Club has mandated the collection of DNA samples for certain pedigreed dogs. Accordingly, a need exists for new and improved systems and methods for educating individuals and for providing convenient access to DNA information for both individuals and their pets through use of Internet-based services.

SUMMARY OF THE INVENTION

Modern technologies such as computer networks and the like, and especially the Internet, offer new opportunities for people to conduct various transactions and business relating to pets, death, DNA and other related subjects. The present invention provides a system and method for conveniently conducting such transactions over a computer network such as the Internet.

According to a preferred embodiment of the present invention, pet tributes and other types of pet transactions may be conducted at several computer network locations or web addresses, or alternatively at a particular one-stop Internet site or brand such as, for example, www.MyPettribute.com. According to the present invention, MyPettribute.com combines, among other activities, tributes, messages, shopping, education and gathering of information into a single one-stop web site that offers a more convenient forum with which to conduct pet related transactions. The present invention is designed to give people an opportunity to create tributes and conduct transactions for any actual or prospective pet regardless of pet ownership or guardianship.

The present invention, of which MyPettribute.com comprises a part, includes a Pet Calculator, which assists a user in analyzing various aspects of any actual or prospective pet. This Pet Calculator is interactive in nature, and requires a user to input information specific to any particular pet. By combining the specific information input by the user with a variety of set parameters for various species and breeds, the Pet Calculator then assesses pet maturity and gives an age classification for the pet of record. The Pet Calculator also provides additional information that would be helpful in addressing specific medical and health needs. In addition, the MyPettribute.com embodiment of the present invention includes information and resources about the mature pet. It serves to address mature medical and health needs, along with ideas for pre-planning on topics such as introducing an additional pet into the household, and advanced versions include other services as described in more detail below.

The present invention also offers a Pet Selector, which assists a user in selecting the right pet to fit any particular taste and lifestyle. Again, a user interacts with the Pet Selector by inputting specific information. The Pet Selector then suggests several species or breeds of animals that would be best suited as pets for that particular individual, along with ideas for pre-planning on topics such as introducing an additional pet into the household. One object of this embodiment of the present invention is to facilitate pet related transactions by offering a range of services focused on the actual or potential pet owner, family, friends and those who wish to plan ahead, and this object is achieved by the system and method disclosed herein.

According to a particular embodiment of the present invention, several computer network locations or web addresses, or alternatively a particular one-stop Internet site or brand such as MyPettribute.com, may also provide a more substantial way to commemorate the passing of pets. This embodiment is designed to give people an opportunity to create tributes for their pets living and deceased and includes obituaries, tributes, announcement notices, sympathy cards, flowers, acknowledgments, keepsake items and online donations for pets. The object of this embodiment of the present invention is to facilitate the mourning of pets by offering a range of services focused on the coordinating mourner, family and friends, and those who wish to plan ahead, and this object is achieved by the system and method disclosed herein.

According to another preferred embodiment of the present invention, several computer network locations or web addresses, or alternatively a particular one-stop Internet site or brand such as, for example, www.MyEtribute.com, offer an opportunity for people to mourn and remember the passing of their loved ones in new and timely ways. Under this embodiment of the present invention, one or more consumer-focused Internet web sites serve to meet the needs of modern mourners, and one or more of these sites are supported by several business-to-business enterprises. Online tributes are provided to offer people a greater opportunity to reach closure when a loved one passes on, as well as information about religious and cultural traditions and specific family requests. Under the present invention, several traditional and additional online services may facilitate the process of observing the occasion and supporting the family, even when the mourners are spread around the country or the world. Site offerings can include obituaries, tributes, proprietary announcement notices, sympathy cards, flowers, acknowledgments, keepsake items and online donations. Accordingly, an object of the present invention is to facilitate modern mourning by offering a range of services focused on the coordinating mourner, family and friends, and this object is achieved by the system and method disclosed herein.

This embodiment of the present invention also includes other brands or related web sites, for example, www.VIPtribute.com, which is an Internet web site designed to facilitate modern mourning of famous or important individuals. This web site can also include items such as obituaries, tributes, proprietary announcement notices, sympathy cards, flowers, acknowledgments, keepsake items and online donations. The object of this embodiment of the present invention is to facilitate the mourning of famous or important individuals by offering a range of services focused on the coordinating mourner, family and friends, and those who wish to plan ahead, and this object is achieved by the system and method disclosed herein.

According to yet another embodiment of the present invention, several computer network locations or web addresses, or alternatively a particular one-stop Internet site or brand such as, for example, www.MyDNAtribute.com, offer an opportunity for people to use the Internet to become informed and educated about expanding opportunities regarding various genetic heritages. This aspect of the present invention provides individuals with a full range of secure choices for themselves, their families and loved ones, and their pets. The objects of this embodiment of the present invention are to provide leading-edge DNA services outside the traditional health care infrastructure, to communicate directly with consumers in their language, to serve as intermediary for consumers with various providers and scientific organizations, to create a repository for the storage of individual or pet health information, and to become a portal for communities with specific genetic issues. These objects of the present invention are achieved by the system and method disclosed herein.

BRIEF DESCRIPTION OF THE DRAWINGS

The included drawings are for broad illustrative purposes, and serve only to provide examples of possible structures for the disclosed inventive web sites. These drawings in no way limit any changes in form and detail that may be made to the invention by one skilled in the art without departing from the spirit and scope of the invention.

DETAILED DESCRIPTION

Figure 1:
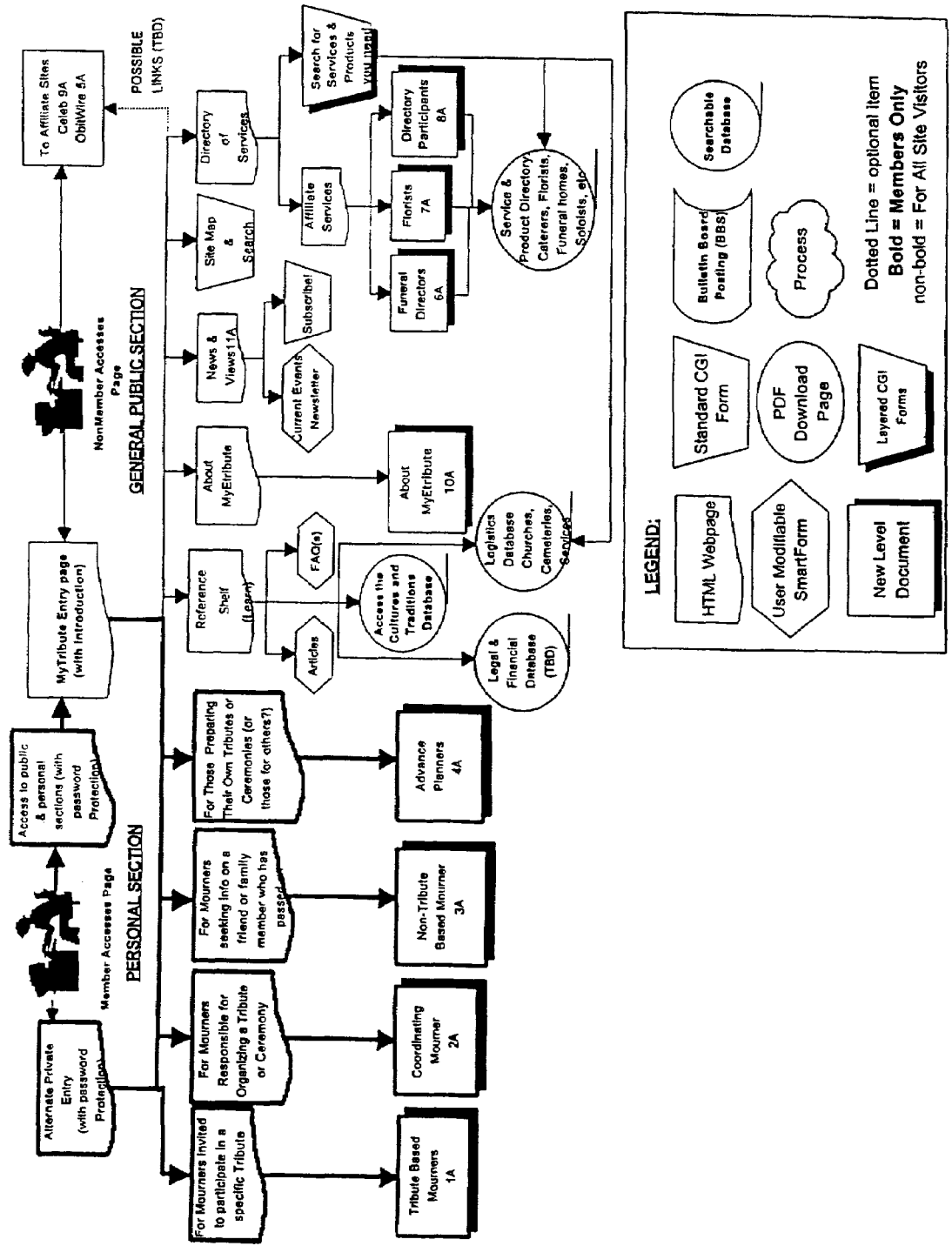
FIG. 1 is a flow diagram overview of the top level of the MyEtribute.com site.
Figure 1A:
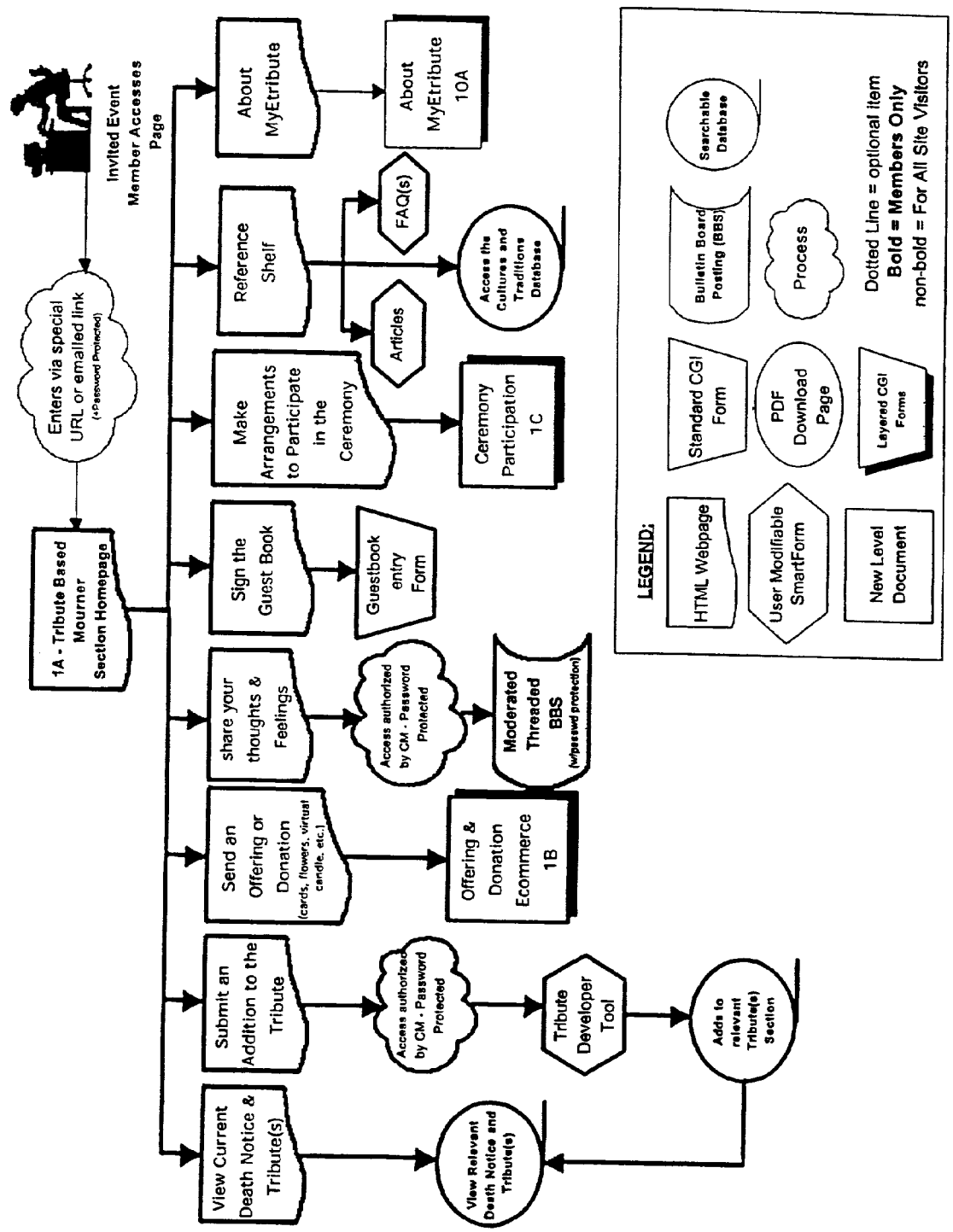
FIG. 1A is a flow diagram of the tribute based mourner's section of the MyEtribute.com site.
Figure 2:
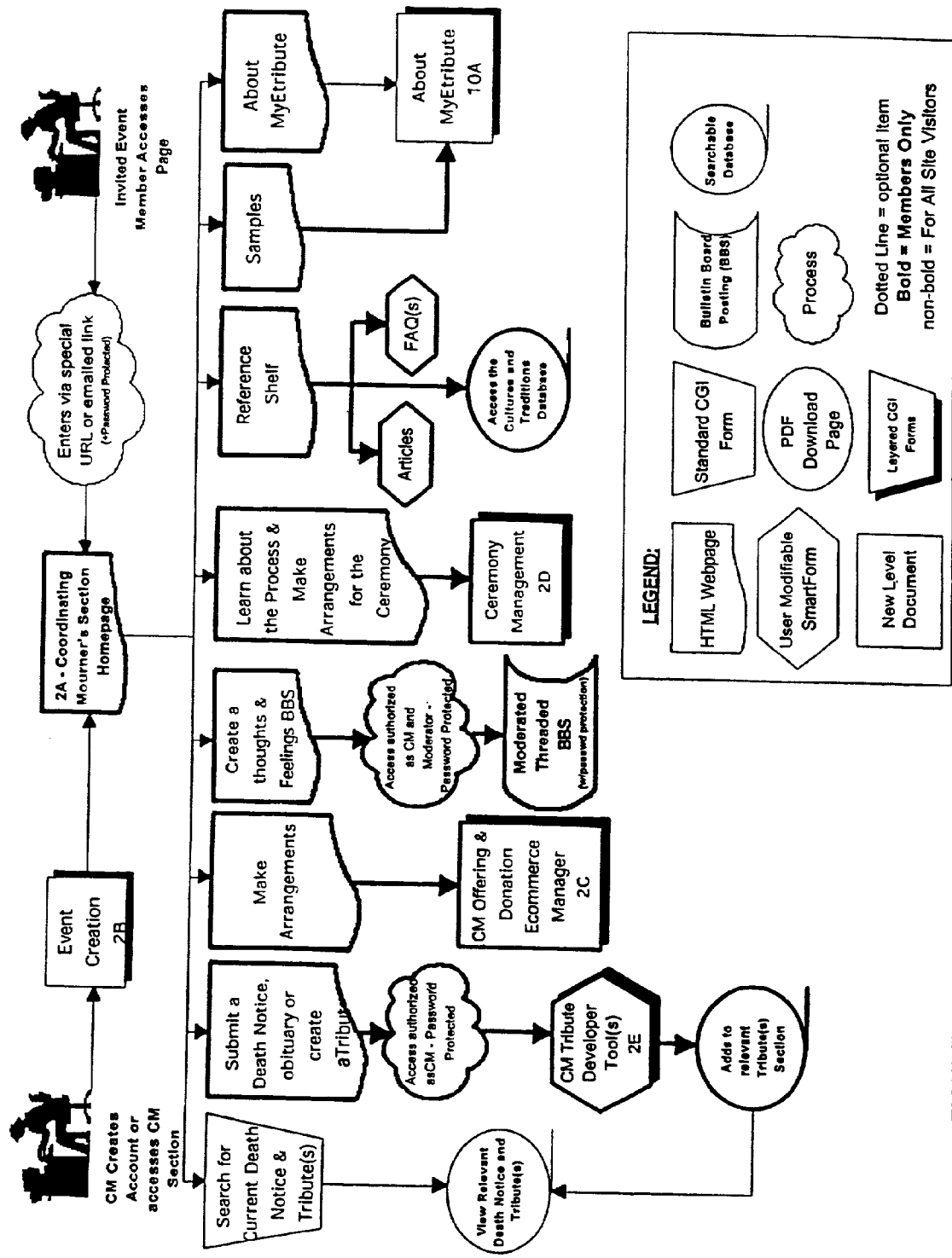
FIG. 2 is a flow diagram for the coordination of the mourner's section of the MyEtribute.com site.
Figure 3:
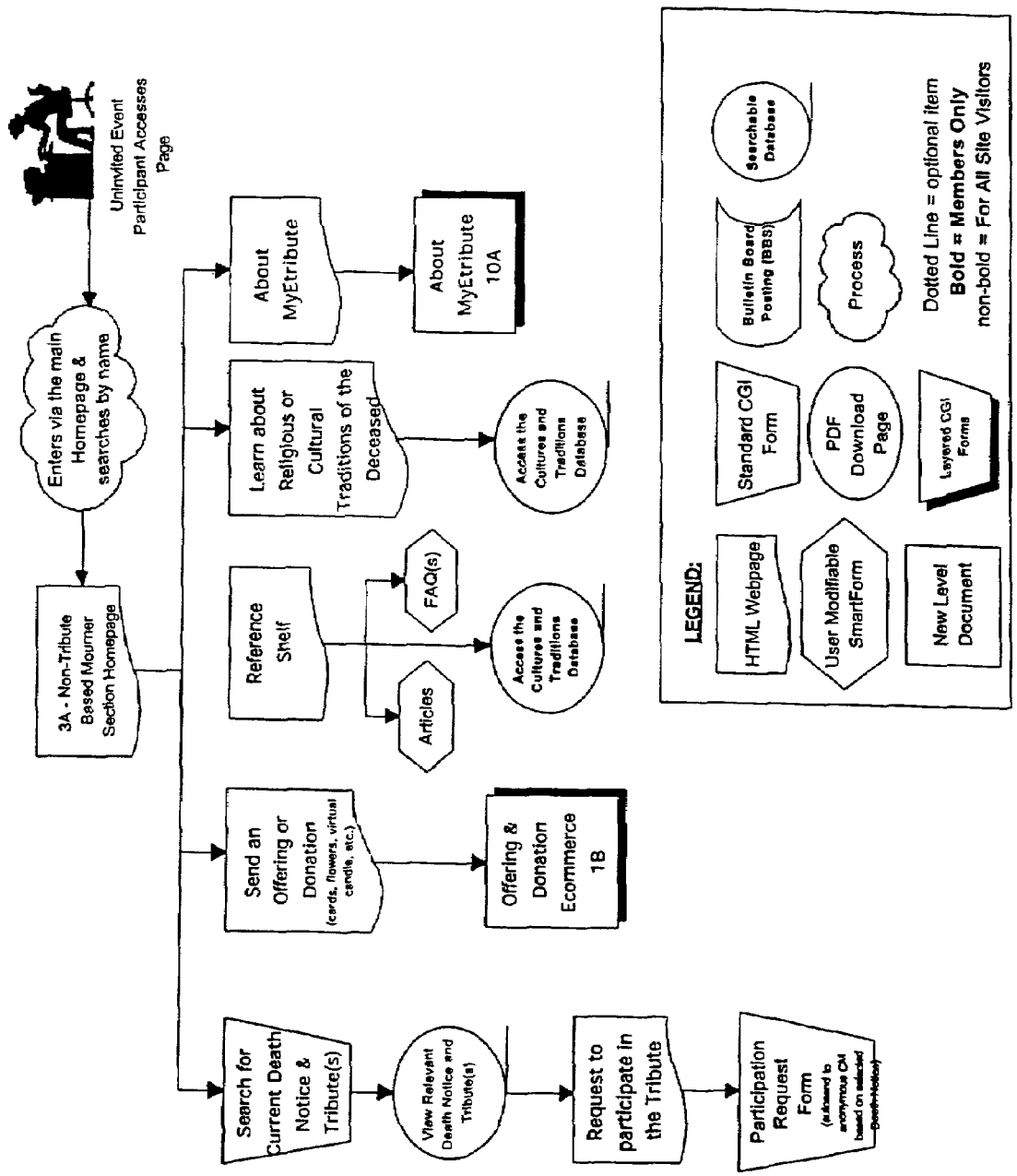
FIG. 3 is a flow diagram of the non-tribute based mourner's section of the MyEtribute.com site.
Figure 4:
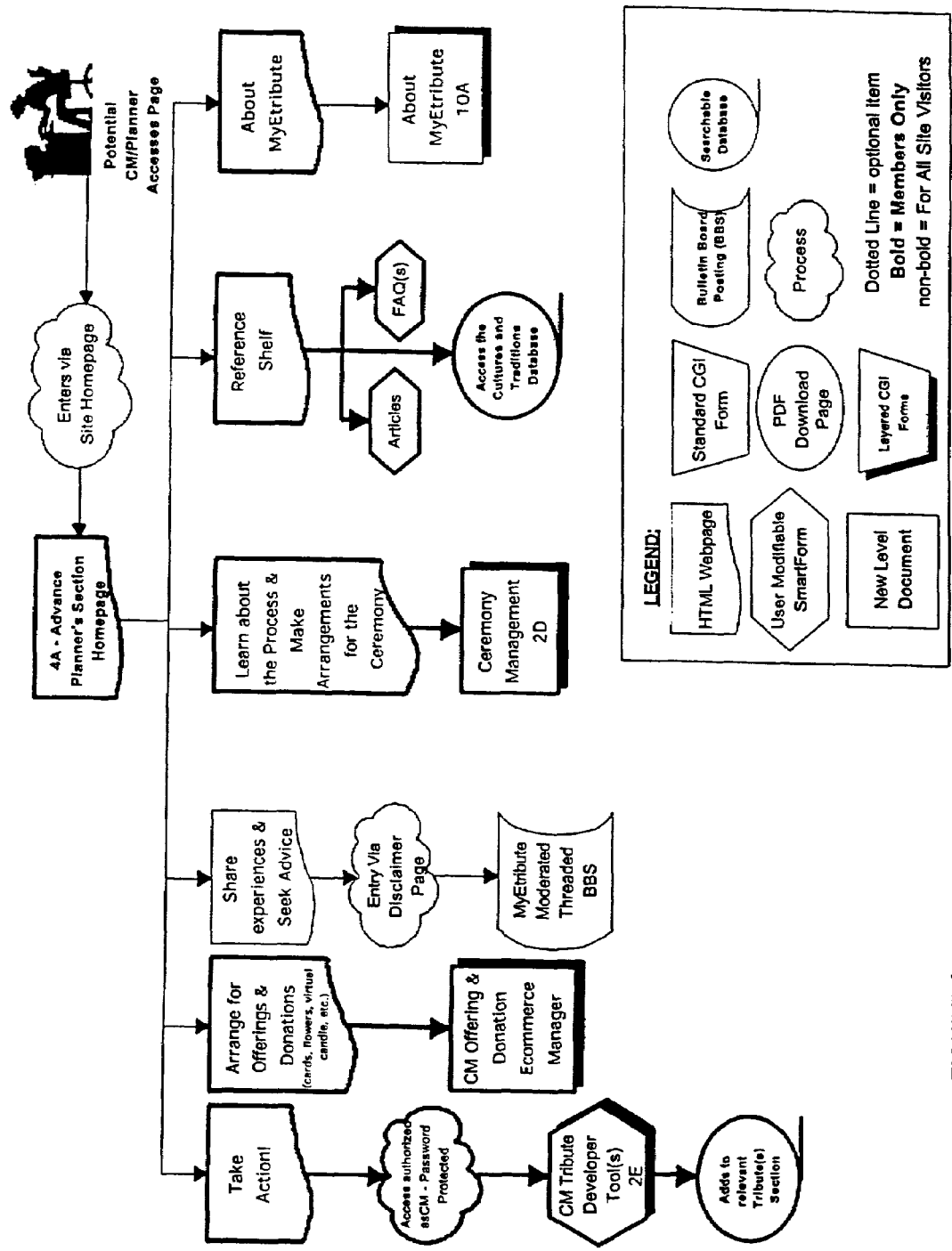
FIG. 4 is a flow diagram of the advanced planner's section of the MyEtribute.com site.
Figure 5:
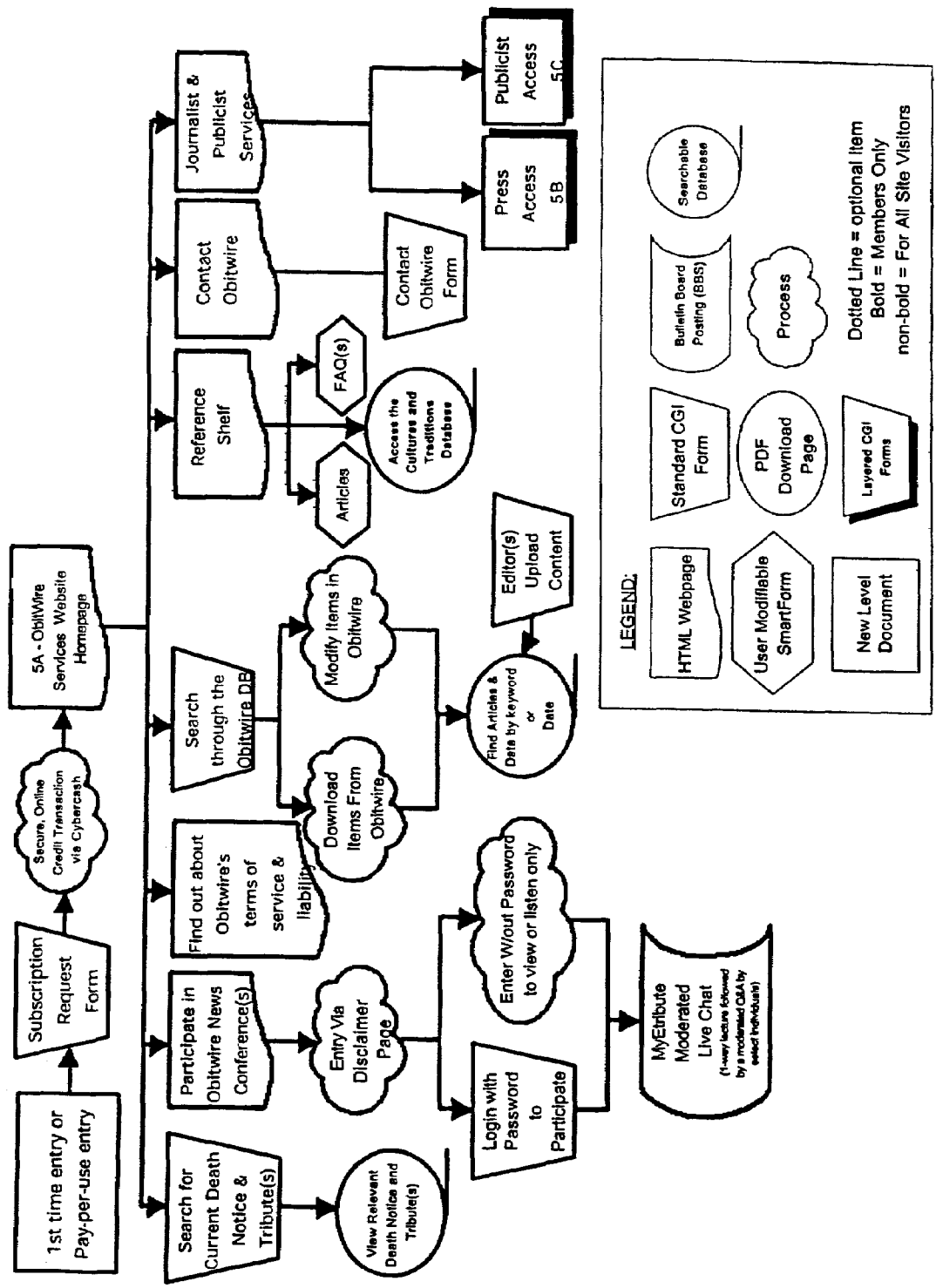
FIG. 5 is a flow diagram of the obitwire, or tributewire, service's site homepage for the MyEtribute.com site.
Figure 6:
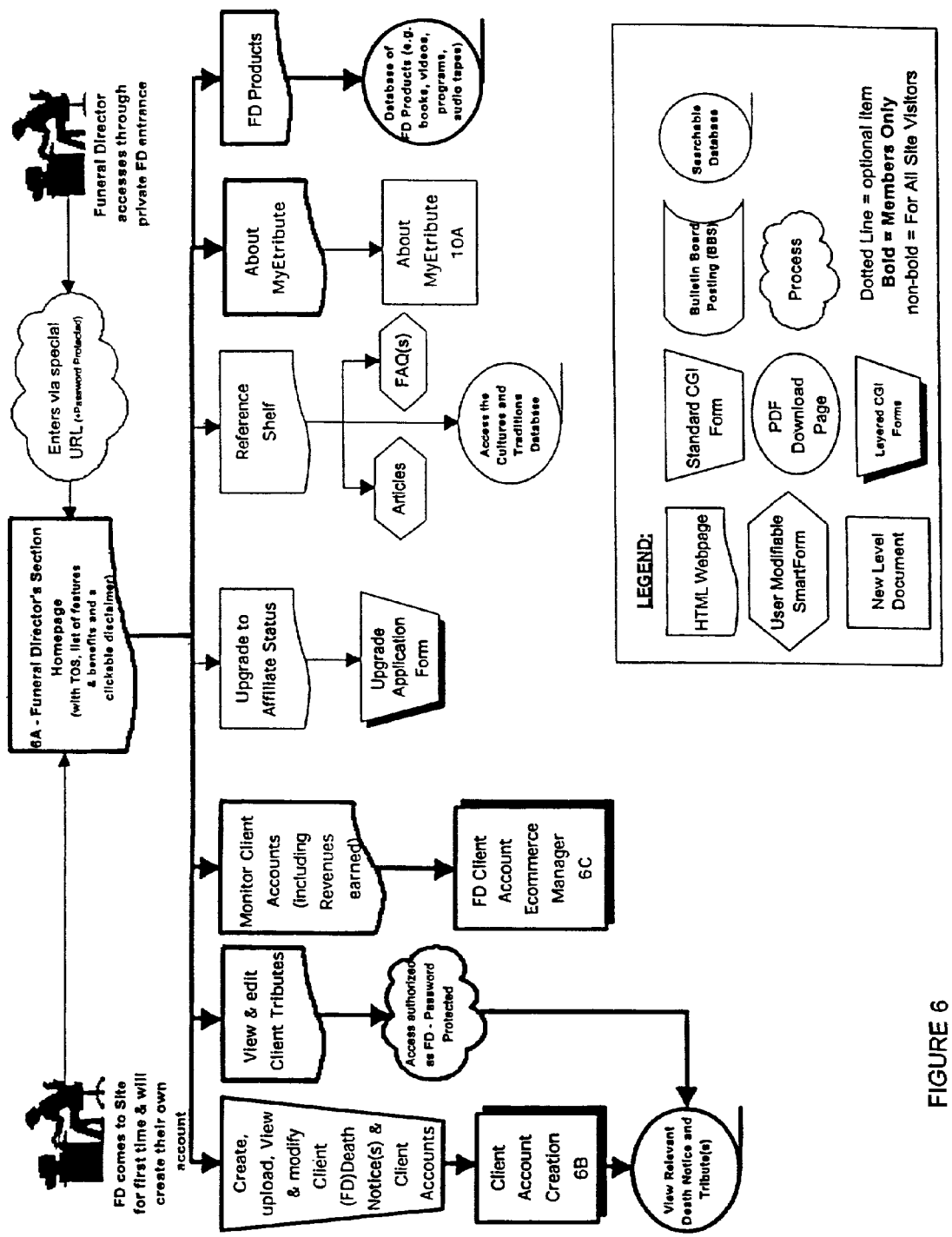
FIG. 6 is a flow diagram of the funeral director's section of the MyEtribute.com site.
Figure 7:
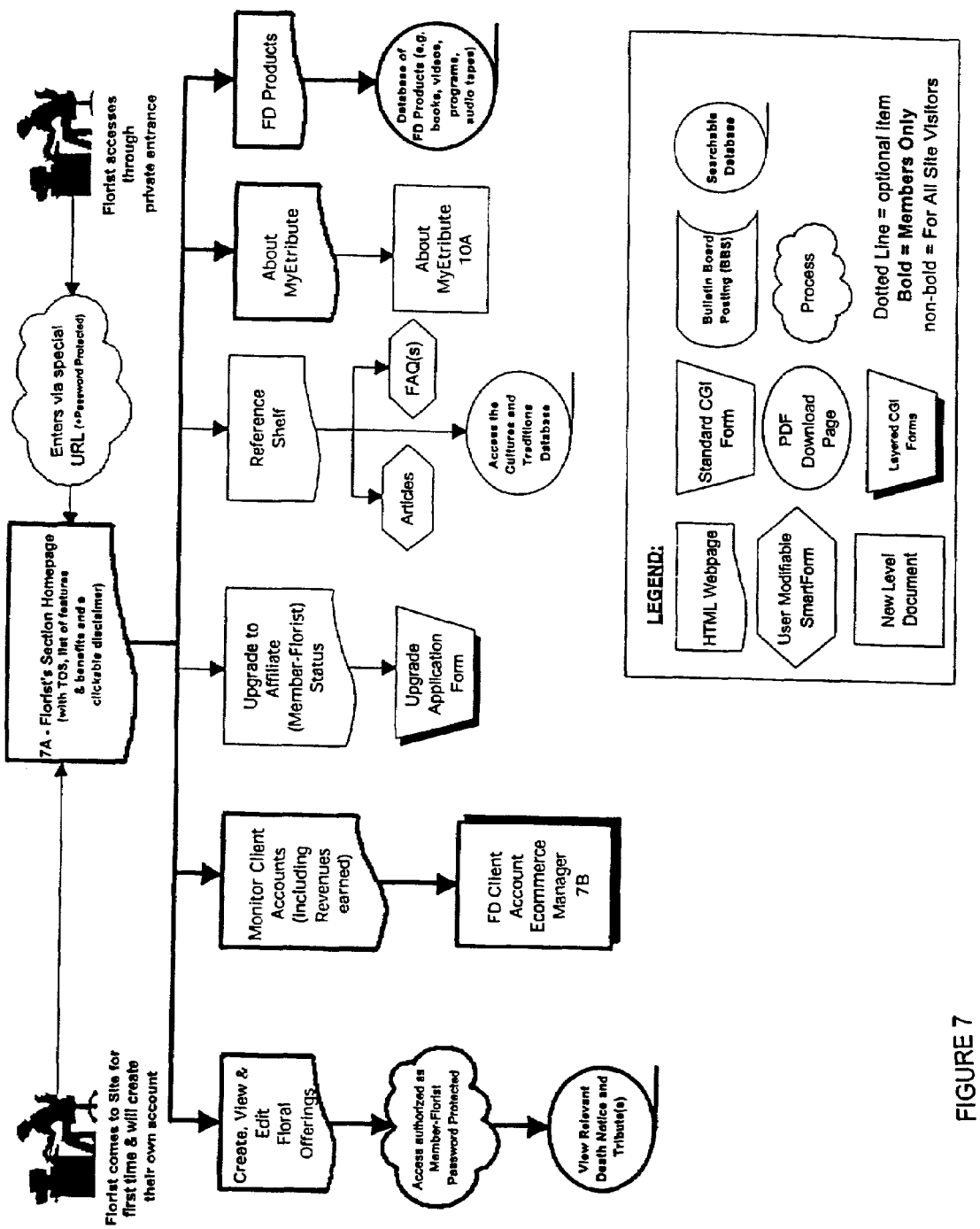
FIG. 7 is a flow diagram of the florist's section of the MyEtribute.com site.
Figure 8:
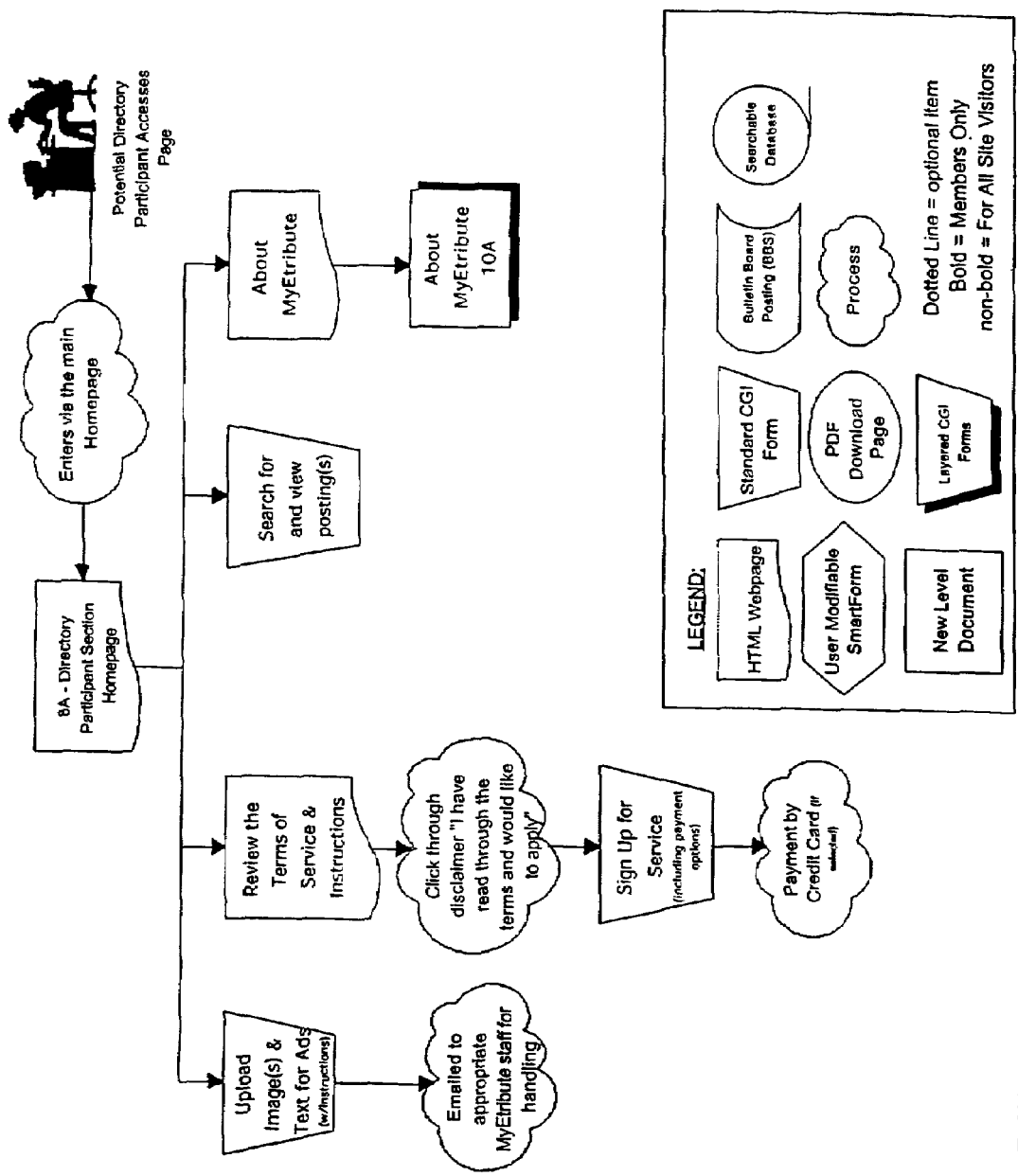
FIG. 8 is a flow diagram of the director participant's section of the MyEtribute.com site.
Figure 9:
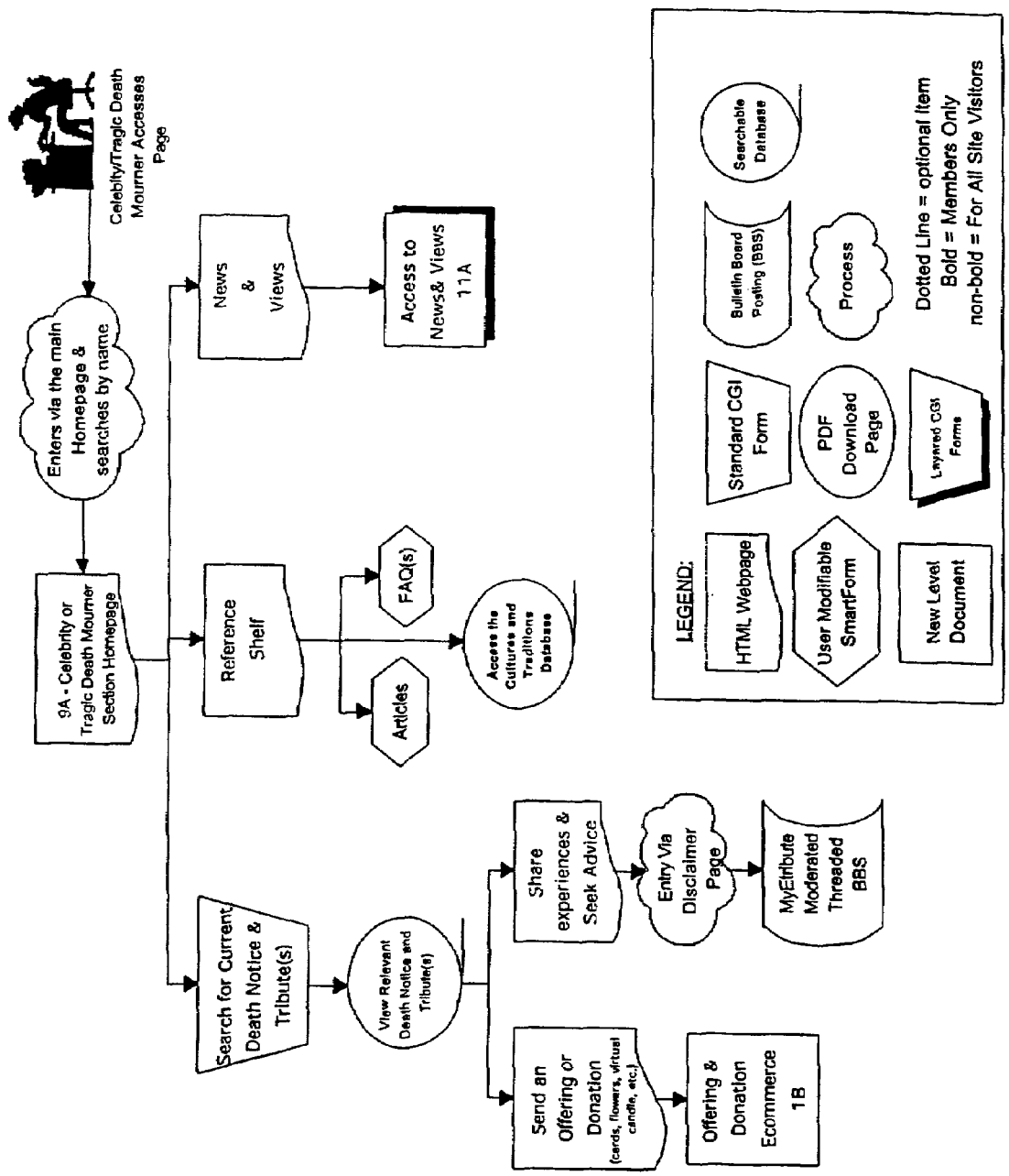
FIG. 9 is a flow diagram of the celebrity/tragic death mourner's section of the MyEtribute.com site.
Figure 10:
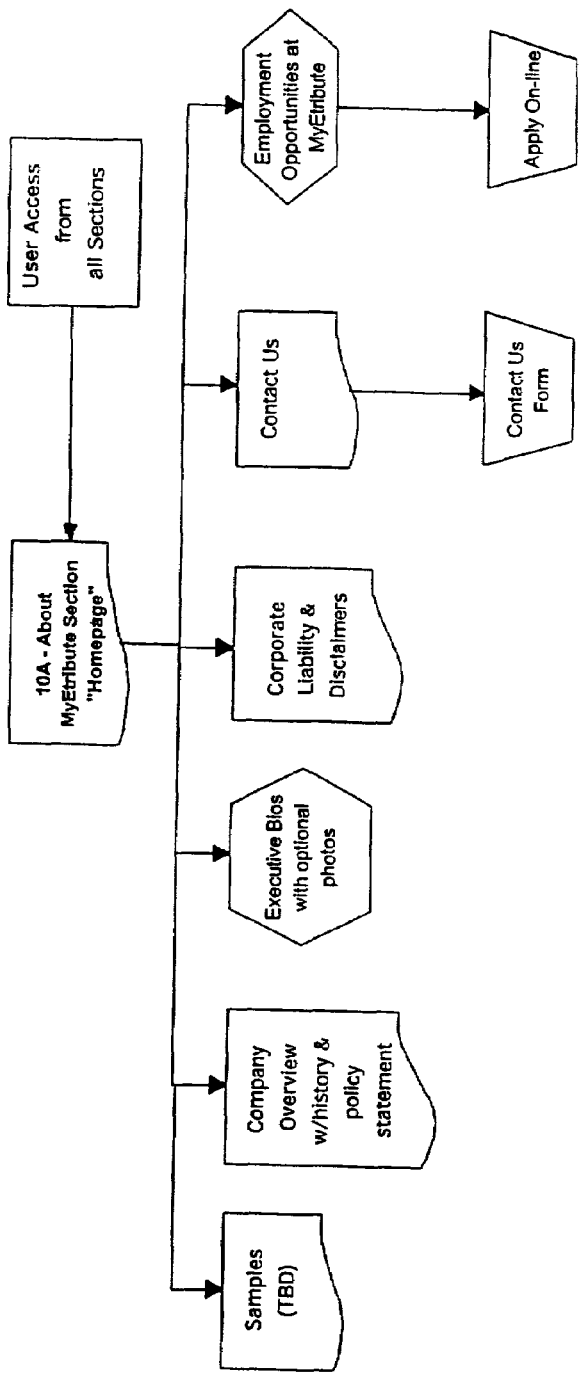
FIG. 10 is a flow diagram of the "About MyEtribute" section of the MyEtribute.com site.
Figure 10:
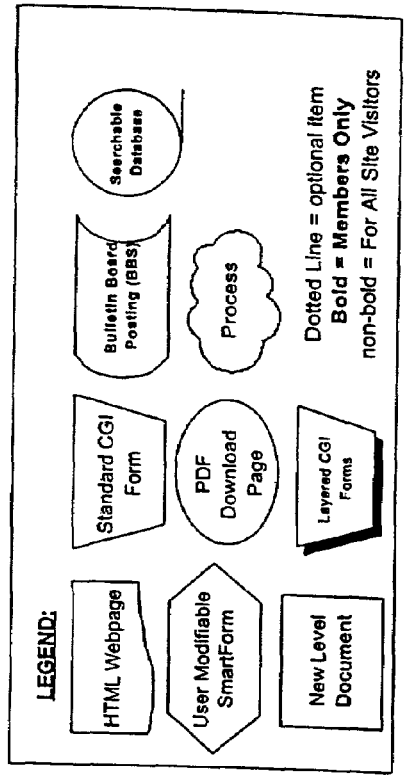
Figure 11:
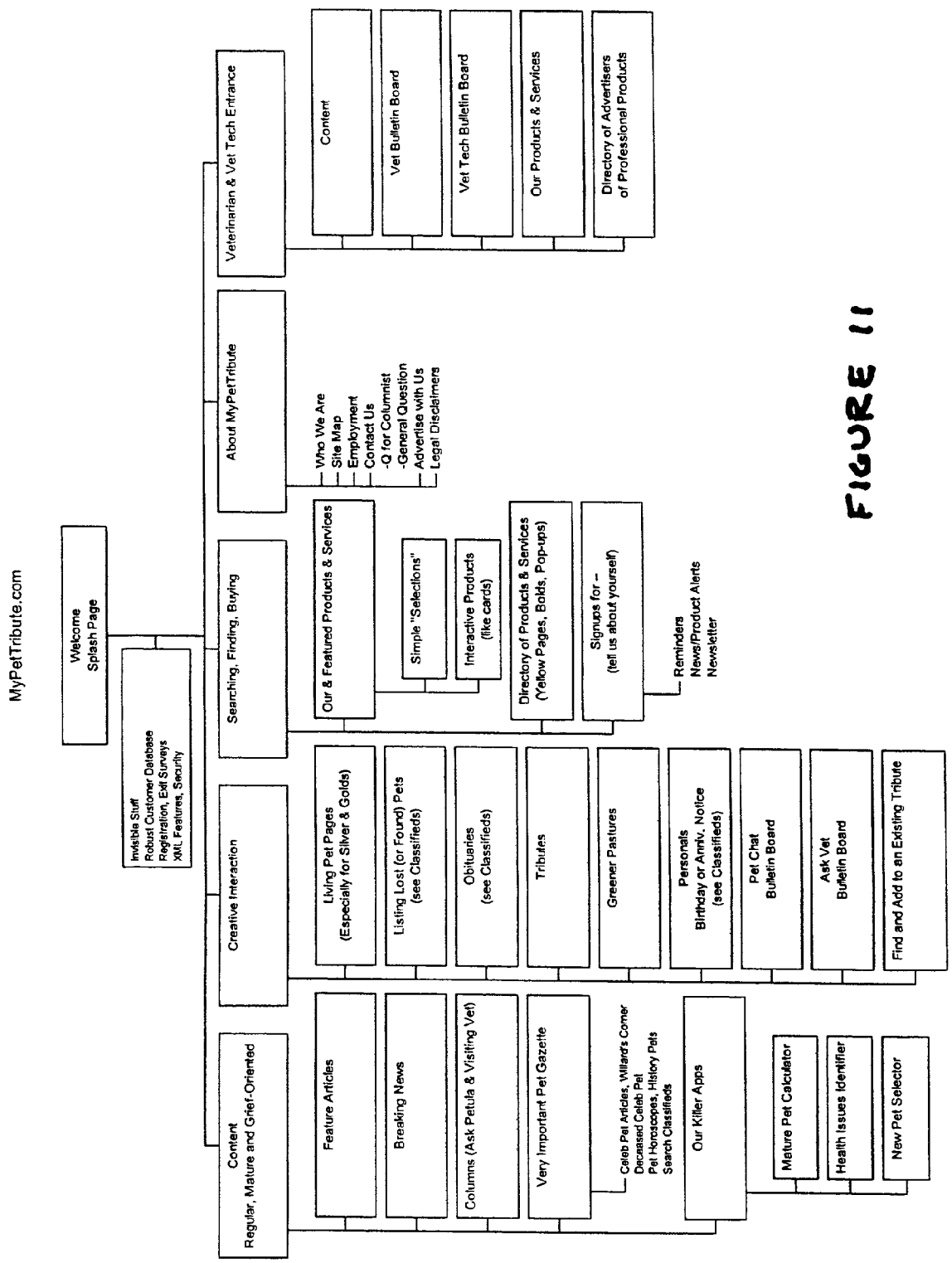
FIG. 11 is a site map diagram of the MyPettribute.com Internet web site.

The present invention provides a system and method for conveniently conducting various transactions and business relating to pets, death, DNA and other related subjects over a computer network such as the Internet. This system and method of conducting such transactions and business includes providing one or more computer servers capable of hosting one or more Internet web sites, such server or servers having features and capabilities as would be well known to one skilled in the art. Such server capabilities include, for example, the ability to register clients, to start client sessions, to send commands to start a client program, to receive commands from a remote computer, to pass commands to a software session, and to transmit data to a remote computer. According to the present invention, this system and method also permits remote users to establish individual or group accounts, to obtain information or order services regarding pets, death, DNA and other related topics from a plurality of sources and vendors, and to be charged for selected services via their established accounts through methods and techniques that are well known to those skilled in the art.

One objective of the present invention is to provide one destination to efficiently plan, create, store, update and implement milestone specific information for coordinating the health and upkeep of a pet. According to a particularly preferred embodiment of the present invention, pet transactions and tributes may be conducted at several computer network locations or web addresses, or alternatively at a particular one-stop Internet site or brand such as, for example, www.MyPettribute.com. According to the present invention, MyPettribute.com combines, among other activities, tributes, messages, shopping, education and gathering of information into a single one-stop web site that offers a more convenient forum with which to conduct pet related transactions. The present invention is designed to give people an opportunity to conduct transactions and create tributes for any actual or prospective pet regardless of pet ownership or guardianship.

Users experience a rich, sensitive and tasteful environment of information, guidance and choice. Once users are ready to act, creative software tools performing functions well known to those skilled in the art, comprehensive product lines and prompt customer service assures that they attain their vision of remembrance. User activities are conducted in privacy and security, under standard security systems and methods that are well known to those skilled in the art.

Audience drivers for the present invention may include pet celebrity tributes, information on pet maturity and pet news of interest. Revenue may be generated from users, for example, through membership fees or per transaction charges. A user may elect to set up a membership having a standard fee, or pay per transaction or occurrence via an established credit card account, as is well known in the art. Other sources of advertising revenue may include, for example, pet product retailers, veterinary service providers, and pet maturity manufacturers.

According to the present invention, a Pet Calculator presents a feature for the care of living actual or prospective pets. The Pet Calculator enables users to interact by prompting them to provide information specific to a particular pet, such that an age classification, general information and recommendations may be generated. Specific information and recommendations may also be generated as more detailed information and preferences are provided by the user. A user activates the Pet Calculator by typing in a specific URL address, or by clicking on a hyperlink that is within the MyPettribute.com web site. The Pet Calculator then prompts the user to answer an array of questions that are specific to the pet of interest. Among other categories, such questions may ask, for example, for the species, breed, sex, age, weight, dietary habits, length of ownership and specific historical anomalies of the pet. This specific information is then checked against set standards that are contained inside databases within the MyPettribute.com computer servers. The Pet Calculator then utilizes database information and performs simple algorithms that are well known to those skilled in the art to produce an array of information such as an age conversion in human years, an age classification, and specific health information, and also makes recommendations for the pet of record.

This Pet Calculator divides animals into various age classifications. Such a division may, for example, include four categories: Youth, Adult, Senior, and Geriatric. Other age classifications, for example Baby, Teenager, and Young Adult, may also be used in conjunction with or in place of one or more of the foregoing classifications. Every actual or potential pet that has its information input into the Calculator is given one of these classifications. Each age classification contains generic information related to that general age grouping, and this information is to be provided to the user. Such information may include, for example, the recommended number and type of veterinary exams that the pet of record should receive per year. While one general veterinary exam per year might be appropriate for the younger age classifications, for example, two exams containing comprehensive blood analyses, fecal exams, urinalysis, dental checks and other specialized tests would be appropriate for senior and geriatric pets.

In addition, information specific to a particular species, breed, or pet can also be provided to the user. Such information may include the expected life spans and average heights and weights for the breed and sex specified. The user may also be alerted to health issues that are specific to the resulting age classification or other information input for that pet, such as breed and specific history. By sufficiently informing the user in this manner, proper consultation with veterinary services can be made and the user can intervene to adjust the lifestyle of a pet in order to manage actual or potential problems.

According to the present invention, information about new drugs and other products are made available to the user whenever appropriate, both in response to user requests and as a result of various Internet advertising techniques well known to those skilled in the art. Information on new clinical findings and treatments may be offered, and such information may be generated due to specifically input answers, user selection, advertiser preferences, or in combination. References to specific outside animal product or service providers may also be given whenever appropriate. In addition, a pet profile printout ("PPP") can be provided to users. This PPP may include some or all of the specific answers that the user has provided to the questions prompted by the Pet Calculator. The PPP may also include, for example, the age classification that has been given to the pet of record, and may also include some or all of the information and recommendations made to the user. Such items may be presented in a tasteful manner with decorative aspects, or may be presented in calendar format, such that a user may be reminded of upcoming events such as routine checkups and birthdays. A PPP can be made available as a benefit to members, or alternatively through a fee to the user, with the rate subject to the type and detail included in the PPP.

In addition, the present invention provides owners of mixed breed pets the opportunity to provide sufficient information such that customized health prognosis and life expectancy profiles may be generated. A specialized extension of the Pet Calculator program permits a user to request a customized multi-breed service and input answers to additional questions. Because such profiles can require the factoring of additional answers or extra individualized research and evaluation, such customized profiles may typically require additional time or database access. Additional charges for such use may then be made as appropriate. According to the present invention, birth date reminder services are provided through a variety of media. A user may elect to receive advance reminders of the birth or other significant date of a pet via e-mail, telephone, or standard postal services. Birthday or other celebratory cards are provided in this manner. As for this and all other elective features described above, these services may be made available as a benefit to members, or through a per transaction fee to the user.

According to the present invention, a Pet Selector feature assists a user in selecting the right pet to fit any particular taste and lifestyle. As in the case of the Pet Calculator, a user activates the Pet Selector by typing in a specific URL address, or by clicking on a hyperlink that is within the MyPettribute.com web site. The Pet Selector then prompts the user to answer an array of questions about their lifestyle and their personal preferences. After checking the provided information against the appropriate MyPettribute.com server database and conducting simple algorithms well known to those skilled in the art, the Pet Selector then suggests several species or breeds of animals that would be best suited as pets for that particular individual. A particular species may be selected as part of the initial question array, such that only breeds are recommended. Further information about particular species or breeds may then be given upon request through standard interactive give and take with the user.

According to another embodiment of the present invention, pet owners and others are provided with an avenue to commemorate the passing of pets. When pets die, their owners wish to remember them and provide an arena in which others may share their grief. The invention includes a site that enables users to post death notices and obituaries, send announcements and set up tributes to their deceased pets. Other family members and friends may send cards and flowers, make donations and add their remembrances to the tribute. The inventive web site also offers a number of keepsakes. In addition, under the present invention, operators of the inventive web site may approach pet magazines to set up obituary columns. Columns, articles, story logs, and other appropriate informational and editorial content are featured prominently within and throughout the site.

The present invention is customer-focused and consumer-driven, using extensive market research, customer relationship management grounded on its own expanding database of information and professional marketing to drive product and service innovation and content development. Due to the nature and sensitivity of its chosen sector, the invention includes the placement of stringent systems to train employees, monitor back-office performance and continuously track customer satisfaction, with particular objectives being to achieve hyper-responsiveness and exceed customer expectations. Non-inclusive examples involving hypothetical users and situations will now be used to illustrate this aspect of the present invention:

SITUATIONAL EXAMPLE 1

Ernie and Doris, Coordinating Mourners for the Death of the Family Cat, Princess Demographics: Husband and wife, 55+, $50,000+ household income, retired, own their own home, have adult children living on their own. Their home is a condominium in Chicago's Lincoln Park area, an urban setting, so backyard burial is not possible for Princess, one of their two surrogate children since the younger of their two children left for college.

Situation: Ernie and Doris, 61 and 58 respectively, have enjoyed being owned by two Maine Coon cats, Oscar and Princess, since the couple's two children left home, the youngest eight years ago. The felines had become, to a degree, psychological replacements for the children. Ernie and Doris joined friends and family in lengthy, joyful and amusing discussions about their pets' habits, with Ernie and Doris taking pride in the usual cat-owners' condition of being servants in the house of feline royalty. The couple doted on Oscar and Princess, who had exquisite beds and bowls in mock-ducal design, the best cat food, every feline toy imaginable (although cardboard boxes were their favorites) and, of course, excellent veterinary care.

When Ernie and Doris adopted the cats, the couple was seeking felines to love, not to show or breed. They also didn't realize how attached they would become to their new "children." So they didn't screen carefully for the type of heart condition that can affect Maine Coons, and unfortunately, Princess developed the condition, which shortened her life span. Ernie and Doris, much saddened, knew they would honor her even in death.

Internet Usage: Ernie had always been a "news junkie." In retirement, he could be found at least two hours a day at his desk facing a TV tuned to CNN, a radio tuned to the local news-talk station (with the volume up or down depending on the TV story or commercial at the time) and, of course, surfing the Web's various news sites.

Family, Friends and Work: Ernie was a public relations director for a Fortune 100 corporation; Doris had begun her adult life as a nurse but preferred to be a full-time wife and mother. They have two sons, both married with children, one family living in the Chicago suburbs and the other in Houston. The sons and daughters-in-law viewed Ernie's and Doris' affection for their cats with some amusement but mostly relief. While the couple directed great attention to their animals, Ernie and Doris were obviously rational, still directing guilt-inflicting phrases to their children about the importance of being with them during the various holidays. Ernie's extensive network of former business associates included a wide range of pet fanciers. He and Doris also had many other social contacts with similar fondness for pets.

Ernie and Doris Visit MyPettribute.com: When Princess became ill, Ernie surfed the Web for information as well as talked extensively with the veterinarian. From both sources, he discovered MyPettribute.com. Although the site didn't have information about the specific illness, it did provide information on mature pets, some of which was helpful for Princess' situation. More importantly, it would be helpful for Oscar in a few years. Seeing the pet Tributes posted by others, and seeing the upscale, tasteful quality of the site, Ernie and Doris decided to post a Tribute to Princess while she was still with them.

E-commerce: Ernie and Doris purchase a Tribute for Princess and other products/services. The couple chooses to use the free e-mail announcement offered by MyPettribute, having it sent to 25 friends.

Viral Marketing Extension: The email message from MyPettribute to the couple's pet-loving friends generates purchases. Over the next 12 months, numerous purchases of mature pet products, Tributes, cards, burial products and keepsakes were made by recipients of Princess' e-mail notification.

Ernie finds MyEtribute and recommends the site to friends and family. Numerous Tributes result, as do purchases of sympathy cards (people buy them in bulk) and flowers from MyEtribute's proprietary selection.

TABLE 1

MyPettribute.com Purchases Related to Death of Princess, Beloved Cat of Ernie and Doris

| Item | Dollar Amount or Formula | Total |
| --- | --- | --- |
| Basic Tribute | $59.95 | 59.95 |
| Upgrade: 1 photo | 2.95 | 2.95 |
| E-mail announcement | 0.00 | 0.00 |
| 8 e-greetings | 8 @ 1.95 | 15.60 |
| 2 cards | 2 @ 2.95 | 5.90 |
| GRAND TOTAL | | 84.40 |

TABLE 2

Viral Marketing: MyPettribute.com and related MyEtribute.com Purchases Over the Next 12 Months

| Item | Dollar Amount or Formula | Total |
| --- | --- | --- |
| 3 Basic Tributes | 3 @ $59.95 | 179.85 |
| Upgrades: 2 photos | 2 @ 2.95 | 5.90 |
| 1 threaded discussion | 19.95 | 19.95 |
| 1 virtual candle set-up | 2.95 | 2.95 |
| 25 Tribute cards (Option 3) | 9.95 | 9.95 |
| 20 virtual candles | 20 @ 0.95 | 19.00 |
| 15 e-greetings | 15 @ 1.95 | 29.25 |
| 30 cards | 30 @ 2.95 | 88.50 |
| GRAND TOTAL | | 355.35 |

SITUATIONAL EXAMPLE 2

Alexandra, Coordinating Mourner for the Death of the Family Dog, Jefferson

Demographics: Female, 35-54, $25-75,000 household income, married, lives in the West, has children living at home, some post-graduate education, works full or part time, owns her own home, putting Jefferson the Scottish Terrier to rest in a simple backyard burial.

Situation: Alexandra (Alexx), 41, is married and has two children (boy, 10, and girl, 7). The family has lived in San Anselmo in the San Francisco Bay Area for the past 10 years; prior to that, Alexx and her husband lived in Southern California where they were born and raised.

The family's Scottie, Jefferson, was with Alexx and her husband for four years before their first child was born. Alexx had always owned a dog, and she knew this breed would be good with children when they arrived. The family members loved Jefferson, and he was a fixture in the children's minds. His death was difficult to take, although expected, given his age of 14 years.

Internet Usage: Alexx, her husband and their son are Internet savvy. Both Alexx and her husband use the Internet for specific research, but occasionally they surf as well. They both use email extensively, both in their jobs and to keep up with friends around the country.

Family and Work: Alexx is a statistical marketing consultant in the telecom industry. She occasionally has local client meetings but never has to travel long distances, and generally works on her computer and the phone at home. The work fits her children's school schedules. She leaves her PC each day to drive her son and, sometimes, her daughter to various lessons and activities. As usual, Alexx also is responsible for most of the family logistics.

Alexx's Visit to MyPettribute.com: As Jefferson the Scottie aged, Alexx sought information on dealing with aging pets. A brochure on mature pets in the veterinarian's office mentioned MyPettribute.com and its articles on the latest information and products related to aging dogs.

Alexx found important and useful information in MyPettribute's articles. She saw the online Tribute portion of the site, and either consciously or subconsciously, it prepared her for the reality of Jefferson's pending death. Alexx saw the touching words and photos from others posting Tributes about their pets.

When Jefferson died, Alexx, her husband and the children sorted through dozens of photos showing Jefferson and family members at different times of their lives. The children easily found a few favorites. Alexx and her husband had a harder time narrowing down their choices, but eventually, the family agreed on five photos that showed Jefferson's special role in the family.

Alexx previewed the choices offered on MyPettribute.com. Offline, she wrote the basic Tribute, then got the family together to tell their favorite stories. Alexx wove them all into the final draft.

E-commerce: Alexx makes several purchases, including a basic Tribute, a backyard marker and a virtual candleholder.

Alexx and her children appreciate the free email notification to the pet lovers among her friends and family. She has the announcement sent to 50 people, all Internet savvy. Throughout the year, she includes the news in notes to friends.

Alexx appreciates the free email acknowledgement sent to those who expressed sympathy either through an onsite purchase or signing the guest book.

Viral Marketing Extension: The 30 mourners who visit the site are intrigued with the concept and the site itself. They visit other pet-death-related sites. None have the depth of information offered by MyPettribute.com. Some make purchases on other sites, but many purchase from MyPettribute as well.

TABLE 3

MyPettribute.com Purchases Related to Death of Jefferson, Pet Dog of Alexandra

| Item | Dollar Amount or Formula | Total |
|---|---|---|
| Basic Tribute for Jefferson | $59.95 | 59.95 |
| Upgrade: 500 extra words | 4.95 | 4.95 |

TABLE 3-continued

MyPettribute.com Purchases Related to Death of Jefferson, Pet Dog of Alexandra

| Item | Dollar Amount or Formula | Total |
|---|---|---|
| Upgrade: 4 extra photos | 4 @ 2.95 | 11.80 |
| Virtual candle holder | 2.95 | 2.95 |
| 20 virtual candles | 20 @ 0.95 | 19.00 |
| Marker for backyard burial | 50.00 | 50.00 |
| 15 e-cards | 15 @ 1.95 | 29.25 |
| 5 donations | 5 @ 1.95 | 9.75 |
| GRAND TOTAL | | 187.65 |

TABLE 4

Viral Marketing: Related MyPettribute.com Purchases Over the Next 12 Months

| Item | Dollar Amount or Formula | Total |
|---|---|---|
| 2 Basic Tributes | 2 $59.95 | 119.90 |
| 1 custom Tribute | 129.95 | 129.95 |
| 2 Upgrades: 500 words | 2 @ 4.95 | 9.90 |
| Upgrades: 7 extra photos (scanned by MyEtribute and returned to customer; cost is $9.95 each) | 7 @ 9.95 | 69.65 |
| 2 virtual candle holders | 2 @ 2.95 | 5.90 |
| 50 virtual candles | 50 @ 0.95 | 47.50 |
| 120 E-greetings | 120 @ 1.95 | 234.00 |
| 30 pet sympathy cards | 30 @ 2.95 | 88.50 |
| 40 donations | 40 @ 1.95 | 78.00 |
| GRAND TOTAL | | 783.30 |

As previously described, the inventive site features a wide variety of columns, articles, story logs, and other appropriate informational and editorial content. The following examples are non-inclusive illustrations of what various pages or story logs of the inventive site or sites may contain, and are not meant to be limiting in any way:

Sample Editorial Content Page

Pet Loss Hurts

Karen James remembers the incident as if it were yesterday, although it occurred years ago. She went into the ladies room at the place she worked only to find a co-worker sobbing uncontrollably. "I asked her what the matter was, and she told me one of her cherished cats had died," James re-called. "But what really struck me was what she said next. 'I don't know what's the matter with me. I didn't cry like this when my mother died.'" One grief counselor says this reaction is far from unusual.

The Pain is Surprising

"People I encounter in pet grief support groups are often shocked to discover how bad they feel when their pets die," she said. "So the questions arises, why do so many of us feel the loss of a companion animal so intensely—and is it normal to feel this way?" She speculates that not only are "companion animals" playing a larger role in our lives, but that "the companionship of animals makes up for the traditional support systems our culture has lost along the way." "With their constant presence, availability and devotion, pets are our best source of unconditional love, becoming for many of us the ideal child, parent, mate or friend," she said.

It's Your Right

One author says that intense grief over a pet's death is normal and natural. "Don't let anyone tell you that it's silly, crazy or overtly sentimental to grieve," she added. "You have a right to feel pain and grief Someone you loved has died, and you feel alone and bereaved. You have a right to feel anger and guilt as well. Acknowledge your feelings first, then ask yourself whether the circumstances actually justify them."

Steps You Can Take

She suggests the following tips for coping with grief over the death of a pet:

1. Accept that you may feel guilt (especially if euthanasia was involved), denial, anger and/or depression.
2. Express your feelings and memories in poems, stories or letters to the pet.
3. Rearrange your schedule to fill in the time you would have spent with your pet.
4. Prepare a memorial such as a photo collage.
5. Talk to others about your loss. If your family and friends love pets, they'll understand what you're going through. If you don't have someone you can talk to comfortably, ask your veterinarian or humane association to recommend a pet loss counselor or support group. Online chat groups also may be supportive.
6. Give yourself time to work through your grief before obtaining another pet.

The present invention also contemplates the use of stories and story logs to assist users in gathering information and learning to cope with their loss. In general, all stories indirectly encourage readers to use MyPettribute and facilitate that usage. To those ends, stories provide useful information from expert sources. Information and ideas in these stories help readers become and feel more educated about topics related to the death of a pet. This should help replace readers' negative ideas about a pet's death and related events with positive ideas, allowing for more memorialization and for participation in the MyPettribute site. Stories are provided on a number of story channels, each of which may be dedicated to related general subject matters, including, for example, Owners of Dying or Recently Deceased Pets; Other Mourners; Owners of Mature Pets; and Preparing for a Replacement Pet. Each story channel contains one or more individual stories providing information to the user in a variety of formats such as, for example, anecdotal, Question and Answer, listings, and other well recognized formats to those skilled in the art. The following example is a non-inclusive illustration of a sample story log hierarchy of the inventive site, and is not meant to be limiting in any way. Other channels, topics, material, links, sources and other contents may be added or rearranged as would be readily understood by one skilled in the art.

SAMPLE PET STORY LOG HIERARCHY

| Story Topic | Sources | Key Points | Links To... |
|---|---|---|---|
| Owners of Dying or Recently Deceased Pets | | | |
| When a Pet Dies at Home: A Checklist of Things to Do | Veterinarians, counselors | Safety and hygiene considerations when dealing with the body, whom to call, what to do in the middle of the night, if children are involved, more | |
| Your Pet's Final Visit to the Veterinarian | Veterinarians | How veterinarians evaluate condition, options for pain relief, rapid death of pet after injection, be sure to say good-bye first | Owners of Mature Pets |
| Is it Time to Let Your Pet Go? | Veterinarians, counselors | How you know a pet is in pain, how veterinarians evaluate condition, options for pain relief, decisive factors, more | Owners of Mature Pets |
| A Simple Remembrance: Backyard Burials | Veterinarians, counselors | Legal considerations, health considerations, proper wrapping material, markers and monuments, ceremony suggestions, value of memorialization, more | Owners of Mature Pets |
| New Ways to Celebrate Your Pet's Life | Counselors, pet cemetery owners, pet store owners, product marketers | Encourage celebration of pet's life: "cookie-cutter" approaches may not be right, value of memorialization, when children are involved, new ceremony ideas, more | Owners of Mature Pets |
| You're Not Alone: People in the Spotlight Speak Out | Notable public figures | Offer validation of the need to grieve a pet's loss through stories of celebrities discussing their feelings of loss when their pets died | Mourners |
| The Sadness is Real | Veterinarians, counselors | Offer validation of the need to grieve a pet's loss and provide advice on coping from experts: grieving for a pet is acceptable, coping with stages of grief, learning from the death of a pet | Mourners |
| A Life-Long Loss | Notable public figures | Celebrities discuss how they dealt with the death of a child's pet | Mourners |
| When a Child's Pet Dies | Veterinarians, counselors | Provide experts' view of how to deal with a child's feelings: grieving for a pet is acceptable, coping with stages of grief, learning from the death of a pet | Mourners |
| Your Pet's Lasting Gift | Notable public figures, veterinarians, counselors, pet or other charity execs | How a donation honors a pet's life, turning a sad time into a useful one, more | Mourners Owners of Mature Pets |
| Everyone Needs a Friend | Notable public figures | Validate the need to grieve a pet's loss by presenting public figures' stories about their former pets | Mourners |
| With Love: Remembering My Pet | After launch: From existing obits/Tributes | Validate the need to grieve a pet's loss by presenting excerpts from individuals' pet stories posted on the site | Mourners |
| If Pets Could Speak | Notable public figures (story written from viewpoint of pets) | Validate the need to grieve a pet's loss by presenting whimsical and touching imaginary stories of well-known pets or the pets of public figures | Mourners |
| To My Human Friend | After launch: From existing obits/Tributes | Validate the need to grieve a pet'a loss by presenting whimsical and touching imaginary stories of pets mentioned by obituary and Tribute posters | Mourners |
| (Daily rotation) Everyone Needs a Friend; | Notable public figures, Tribute, | Brief excerpts and quotes from longer stories about celebrities' and Tribute | (POSTED ON HOME |

-continued

SAMPLE PET STORY LOG HIERARCHY

| Story Topic | Sources | Key Points | Links To... |
|---|---|---|---|
| With Love: Remembering My Pet (Excerpts from existing stories) | obituary and death notice posters | posters' pets | PAGE) |
| (Daily rotation) They Were Heroes | Heroic animals in the news | Brief excerpts and quotes from existing stories on site and from news reports about animals who died in service, helping others | (POSTED ON HOME PAGE) |
| (Daily Rotation) Celebrating a Life | Counselors, pet cemetery owners, pet store owners, product marketers; after launch, obits/Tributes | Brief excerpts and quotes from existing stories on site and from news reports discussing trends in pet memorializations | (POSTED ON HOME PAGE) |
| We Loved Them All: Furry, Wrinkled and Wiggly | Owners of exotic pets, veterinarians, counselors | Touching and amusing stories about exotic pets, importance of working through grief, memorializing exotic pets, more | Mourners, Mature Pets |
| Mourners of Family Members' and Friends' Pets | | | |
| Support the Human Who Stays Behind | Notable public figures, counselors (authors), veterinarians | Help solve problem of how to acknowledge the death of a friend's pet; gain attention for this topic with use of public figures as sources; grief counselors, etiquette experts and other celebrities offer tips on offering support to adults without children, adults with children and children directly | |
| The Appropriate and Gracious Response | Counselors (authors) | What to say and do, what gifts are appropriate, timing of greetings and gifts, more | |
| Owners of Mature Pets | | | |
| Frequently Asked Questions: The Aging Dog | Questionnaire completed by leading veterinarians | Behavioral changes, common conditions, how to help, how to tell if a pet is in pain, how to work with a veterinarian, question of termination, more | |
| Frequently Asked Questions: The Aging Cat | Questionnaire completed by leading veterinarians | Behavioral changes, common conditions, how to help, how to tell if a pet is in pain, how to work with a veterinarian, question of termination, more | |
| Making a Dog's Life Easier: Tips and Products for the Mature Canine | Veterinarians, counselors, pet product manufacturers | The most common conditions, how to help your pet, products that can help | |
| Checklist: Products for the Elderly Dog | Pet product companies, veterinarians, counselors | Current and emerging products for the mature dog | |
| Your Cat's Ninth Life: Tips and Products for the Mature Feline | Veterinarians, counselors, pet product companies | The most common conditions, how to help your pet, products that can help | |
| Checklist: Products for the | Pet product companies, veterinarians, | Current and emerging products for the mature cat | |
| Elderly Cat Pet Insurance: How to Give Them the Best | counselors Veterinarians, counselors, pet actuaries, pet insurance companies | Why insure, cost, how to obtain, more | Replacement Pets |
| Preparing for a Replacement Pet | | | |
| Is it time for a new pet? | Veterinarians, counselors | How to gauge a child's interest in a new pet, making a place for a new pet, when a pet is already present honoring the former one, more | Recently Deceased, Mourners |

Another objective of the present invention is to provide one destination to efficiently plan, create, store, update and implement milestone-specific information for coordinating mourners and discrete mourning communities to assist in efficiently mourning the passing of human loved ones. According to another particularly preferred embodiment of the present invention, death related transactions and tributes for deceased human loved ones may be conducted at several computer network locations or web addresses, or alternatively at a particular one-stop Internet site or brand such as, for example, www.MyEtribute.com. According to the present invention, MyEtribute.com combines, among other activities, tributes, messages, shopping, education and gathering of information into a single one-stop web site that offers a more convenient forum with which to conduct death related transactions.

This inventive Internet web site facilitates the announcement and communication needs of the family member who has the primary responsibility for planning the funeral for a beloved deceased individual. These services include the death notice, the obituary, service information, wishes and donation information, distribution, guest book and acknowledgments. The present invention also facilitates access to a range of funeral and announcement services that can become an additional source of income for funeral directors. Publicists and newspapers also can find additional outlets for their stories and increased exposure.

A detailed product offering for each category allows mourners to select from basic services that are free or have a nominal fee to a range of fee-based custom services with staff writers available to users. The core of the site is a tribute page that is to be posted by the individual responsible for making funeral arrangements and may be made available to a particular mourning community. Password protection is provided for those who choose it. These tribute pages may include a wide variety of items, for example, pictures, life stories and people's remembrances. Individually purchased pages on the inventive web sites are posted initially for a set time period, for example three months, with an option to continue. This aspect of the present invention accordingly enables the individual responsible for the tribute to open participation to the mourning community at large.

MyEtribute.com provides a platform for mourners to learn about the death, respond to family wishes and access additional information. The invention allows mourners to view the death notice or obituary online and respond in a number of ways. They can send sympathy cards, flowers and buy virtual candles. They can make donations to nonprofit groups in the name of the deceased. They can receive acknowledgments and tax documentation electronically. Or, they can simply access the site's religious and cultural database to educate themselves about another culture's responses and rituals around death. Then, they can initiate an appropriate response through one of the many offerings. Additional products and services may include, for example, custom obituaries, custom tribute sites, a variety of announcements and acknowledgments, memorial plaques, memorial cards, virtual cemeteries and reminders. The foregoing examples are not intended to be limiting in any way, as it is believed that people will want to have access to an even wider range of choices from which to select what is appropriate for each situation.

In addition to the consumer products and services offered under the present invention, substantial business-to-business opportunities are presented as well. Partnerships can be created with funeral home directors to ensure a flow of new site users by offering funeral directors a percentage of all revenue they direct to the site. The present invention builds on this initial relationship, offering products that a funeral director can provide directly to his or her customers. In addition, revenues to newspapers may be increased by giving users a choice of newspapers for listing the obituary and providing links to obituaries from newspapers throughout the country. According to this aspect of the present invention, the inventive site can send the death notices it produces to newspapers in all geographic areas to which the deceased had ties. This typically increases the number of death notices to a variety of newspapers, which death notices will typically be longer than the usual newspaper style. Consequently, death notices placed in newspapers by the site require more advertising space, and in turn generate more newspaper ad revenue. Under the present invention, MyEtribute.com receives a percentage of newspaper ad revenue generated from the site.

The present invention is customer-focused and consumer-driven, using extensive market research, customer relationship management grounded on its own expanding database of information and professional marketing to drive product and service innovation and content development. Due to the nature and sensitivity of its chosen sector, the invention includes the placement of stringent systems to train employees, monitor back-office performance and continuously track customer satisfaction, with particular objectives being to achieve hyper-responsiveness and exceed customer expectations. Technology and design decisions improve the end product of the present invention through ease-of-use and customer friendliness. Special advisory and consulting groups are utilized to help assure accurate interpretation of emerging consumer trends. The corporate identification and registration strategy of the invention has been designed to accelerate the brand-building process in conjunction with at least five related sites: MyEtribute.com, MyPettribute.com, VIPtribute.com, Protribute.com and Tributewire.com.

The present invention contemplates use of experienced content developers. This involves an internal site and product design capability, but also uses multiple outside designers and contracts with a floral design specialist to create a proprietary line of floral arrangements with related content. Over 250 products and services have been developed for the inventive web sites. These human and pet sites have been developed and tested, and site revisions have and will be made and initial product inventories produced. Marketing programs to professional audiences have been implemented and significant numbers of trade affiliates registered on the site. The consumer marketing program has been finalized, and print ads, broadcast spots and direct mail materials produced. A trained customer service team manages the sites, which are supported by a significant consumer marketing program and a continuing professional outreach program.

Also contemplated in the present invention is a plan for synergistic partnering strategies. Alliances have and will be built only with enterprises bringing strategic objectives, products or services that add value to the MyEtribute brand and demonstrate shared brand values. Revenue from business-to-business enterprises may be generated under a separate brand such as ProTribute.com, as it is possible to develop and market specialized products and services to many industries such as the funeral home industry. It is also contemplated under the present invention to offer products and services addressing pet maturity and mortality to veterinarians and pet stores under the ProTribute.com brand. Non-inclusive examples involving hypothetical people and situations will now be used to illustrate potential uses of the present invention:

SITUATIONAL EXAMPLE 3

Susan, Coordinating Mourner for the Death of Her Mother, Elizabeth

Demographics: Woman, 35-54, $75,000+ household income, married, lives in the Northeast, has 1-4 years of college education, works part time, has older children living at home (maybe college age)

Internet Usage: For her current job, Susan has learned several computer office programs and often accesses the Internet. Susan's two teen-age sons and 11-year-old daughter are savvy Internet users.

Family and Work: Susan, 43, is married to a 46-year-old corporate human resource executive. They have three children: two boys, ages 17 and 15, and one girl, 11. Susan's mother, Elizabeth, died of breast cancer at the age of 68. Elizabeth's husband (Susan's father), a senior vice president of marketing for a Fortune 500 corporation, died from heart disease at the age of 76 two years ago.

Susan has one brother, a married professional with two children, a boy and girl. The brother is two years older than Susan is, and his children are just slightly older than Susan's is. Susan has three uncles and two aunts. Two uncles and one aunt are Elizabeth's siblings; the remaining uncle and aunt are Susan's father's siblings. None live near Susan. When Elizabeth's husband retired, the couple moved to Susan's geographic area.

Susan is planning a return to the workforce once her daughter enters high school. She currently works part time in a real estate office while she studies for the real estate license examinations. With her many community contacts, she is excited and optimistic about the new career she is planning.

Situation: Susan's mother, Elizabeth, lived in the same geographic area as Susan does. However, Susan's father had been a corporate executive, and Elizabeth and her husband lived in 10 different cities before retirement. In the last two cities, they had been highly visible and active citizens; in most of the prior communities, they had been moderately active. Elizabeth's other child (Susan's brother) and his two children, as well as Elizabeth's siblings, live elsewhere.

Reactions to Elizabeth's Death: Susan's husband is sympathetic, but the demands of his job, and perhaps his own views of mortality and of family divisions of labor, mean he leaves the handling of the arrangements to Susan. While Susan's teen-age boys are helpful, they react to their grandmother's death the way many teen-agers might, behaving appropriately at the right times but carrying on their usual lives behind the scenes. The younger girl needs more attention, although no unusual behavior is occurring.

Funeral Director Meeting: Susan always knew which funeral director she would use—the same one who had handled her father's death. When Susan alerted the funeral director to her mother's death, he handled the immediate needs (such as removing the body from the hospital) but also made an appointment to meet with Susan the next morning.

When Susan and the funeral director met to plan other arrangements, the director was confident that Susan would want a death notice placed in the local newspaper. However, he needed to ask whether she would want wider distribution of the obituary. Susan is an Internet user, and she often trades PC and Internet advice with her children, her brother and her two nephews. She knew they would value placement on the Web but would be concerned about security.

Placement on MyEtribute.com: The funeral director asks Susan about uploading the death notice to MyEtribute.com. He tells her that if she desires, the death notice can have limited information—no funeral arrangement dates and times, for example. She likes the idea but would like a more extensive, but secure, posting. He tells her about MyEtribute's obituaries and Tributes, handing her promotional material from the company. Susan sees in the promotional material that MyEtribute can place the death notice in any U.S. newspaper, alumni magazine and professional magazine. She also sees that obituaries and Tributes can be password protected. Susan likes these options. She asks the funeral director to upload the death notice information to MyEtribute.com.

Susan's visit to MyEtribute.com: When Susan visits the site to view the death notice, she is impressed with the site's appearance and tone. The site is respectful without being stodgy. Because she has viewed a wide range of sites on the Internet, she is impressed with the writing style (straightforward, not "market-ese"). The "welcome" text on the home page is warm but straightforward. Navigational choices are clear; it's easy for her to choose a path that addresses her interests. The combination of visual appeal and writing style encourage her to review some of the stories and other features (E-commerce opportunities, for example) on the site.

As Susan navigates the site, she sees:
A warm welcome on subsection home pages.
A clear explanation of how to navigate from each page.
Caring and useful information, including articles on:
Travel tips for the bereaved and out-of-town mourners (who aren't close family).
How to take care of yourself during this stressful time.
What to expect during the wake/funeral/burial period; logistical checklist to help her organize the process.
A description of beliefs and customs related to her mother's religious denomination, which will be useful for some mourners outside the family.
New ideas for memorializing a life, which encourages Susan to think about celebrating her mother's life in addition to mourning her death.
New ways to think about the grieving process, which helps Susan reduce stress.
Other articles on death, dying and grieving; she makes a note to review those later.
Articles on topics that might be helpful to her later, such as those on estate planning, other religions and etiquette.

E-commerce: As Susan navigates the site, she sees several product and service options that appeal to her. Even with a funeral director's help, Susan has a demanding schedule for the next few days. Several timely and appropriate options from MyEtribute.com seem helpful to her, including the secured obituary and the free email notification option, which will allow her to alert everyone on her personal email list without doing the emailing herself. Asking herself whether she'd rather write a Tribute now or handle emailing, she knows the Tribute is more important.

After her father's death, Susan was able to view the end of her mother's life more clearly. When her mother became ill, Susan began thinking about the things she wanted family and friends to know about her mother. The Tribute option on MyEtribute was a perfect vehicle for this. Now that this vehicle exists, Susan thinks, "I'll post one for my father as well later on."

Mourners' Visits to MyEtribute: Because Elizabeth, her husband and Susan's family all lived in the same area for more than 10 years, a large number of area residents paid their respects, as did most of the out-of-town relatives. About 100 people attended the wake and/or funeral; many sent flowers. Another 30 sent cards, flowers or both. All received Tribute cards, which carried the MyEtribute.com logo. When Elizabeth's obituary appeared in the two out-of-town newspapers, another 30 mourners responded over several weeks. The obituaries mentioned that a Tribute had been posted on MyEtribute.com.

Of the total 160 mourners, 30 visited MyEtribute.com either directly or with the help of more Internet-savvy friends or relatives. Many site visitors made purchases.

Viral Marketing Extension: Susan intends to create a Tribute for her father immediately, but events and her own emotions get in the way. She also revisits her mother's Tribute and decides to make changes. About six months after her mother's death, Susan creates a Tribute for her father. Again, she asks MyEtribute to send the free email notification about her father's Tribute. However, for a few close relatives and friends, she emails a note herself encouraging them to view her mother's Tribute again because of the changes Susan has made.

Susan visits MyEtribute.com in the months ahead as she returns to her usual part-time work schedule, continues studies for her real estate license and takes the examination. She passes, and while remaining in her part-time real estate office job, she develops a more active social schedule for herself and her husband so she can network for her future career. MyEtribute.com lets her respond to various deaths related to her business/social contacts in appropriate and timesaving ways. New card and flower offerings appear on MyEtribute.com over time. Susan always has new choices. Several mourners who visited the site were impressed with the informative articles and the product and service offerings. Tributes, obituaries, donations, newspaper placements, card and flower purchases and many other e-commerce transactions occur during the next year as a result of mourners' visits to Elizabeth's obituary and Tribute on MyEtribute.com.

TABLE 5

MyEtribute.com Purchases Related to Death of Elizabeth, Mother of Susan, Coordinating Mourner

| Item | Cost | Total |
| --- | --- | --- |
| Long Custom Obit 1 | $59.95 | $59.95 |
| Basic Tribute, Susan's mother | 59.95 | 59.95 |
| Tribute Upgrade: 500 words | 4.95 | 4.95 |
| 10 photos, scanned by user | 2.95 @ 10 | 29.50 |
| Announcement Option 1 (email) | Free | 0.00 |
| Acknowledgement Option 3 (printed, informal card) | 2.95 @ 100 | 295.00 |
| Obituaries placed in 3 newspapers | 9.95 handling fee @ 3 | 29.85 |
| Establishing donation option | Free | 0.00 |
| 10 donations | 10 times $1.95 handling fee | 19.50 |
| 100 Tribute cards (keepsake) | 100 for 19.95 | 19.95 |
| 50 Tribute programs | 50 for $29.90 | 29.90 |

TABLE 5-continued

MyEtribute.com Purchases Related to Death of Elizabeth,
Mother of Susan, Coordinating Mourner

| Item | Cost | Total |
|---|---|---|
| Laminated obituary | 9.95 | 9.95 |
| Greener Pastures (long-term post) | $295.00 | 295.00 |
| 100 MyEtribute sympathy cards | 2.95 @ 100 | 295.00 |
| 5 floral arrangements | 10% of $250 in floral purchases | 25.00 |
| GRAND TOTAL | | 1173.50 |

TABLE 6

Viral Marketing: Resulting MyEtribute.com Purchases
Over Next 12 Months

| Item | Cost | Total |
|---|---|---|
| Basic Tribute (Susan's father) | $59.95 | $59.95 |
| 2 500-word upgrades (Susan) | 2 @ 4.95 | 9.90 |
| 10 photos, scanned by Susan | 10 @ 2.95 | 29.50 |
| Greener Pastures (Susan) | 295.00 | 295.00 |
| 5 Basic Tributes (others) | 5 @ 59.95 | 299.75 |
| 6 500-word upgrades (others) | 6 @ 4.95 | 29.70 |
| 7 photos, scanned by users | 7 @ 2.95 | 20.65 |
| 45 cards (others) | 45 @ 2.95 | 132.75 |
| 10 e-greetings (others) | 10 @ 1.95 | 19.50 |
| 250 acknowledgements (others) | 250 @ 2.95 | 737.50 |
| 50 floral arrangements, avg. $50 each (others) | 50 @ 50.00 | 250.00 |
| 18 donations | 18 @ 1.95 | 35.10 |
| 5 minimum orders, Tribute cards (others) | 5 @ 9.95 | 49.75 |
| 1 order, 50 Tribute programs (others) | 19.95 plus 9.95 (25 plus 25) | 29.90 |
| 2 laminated obits (others) | 2 @ 9.95 | 19.90 |
| 1 laminated program (others) | 9.95 | 9.95 |
| GRAND TOTAL | | 2028.80 |

SITUATIONAL EXAMPLE 4

Deborah, Long-Distance Mourner of Former
Asian-American Classmate, Anna

Demographics: Female, 25-34, $25-50,000 income, works full-time, single, no children, lives in the West, educated.

Situation: Deborah (Deb), 27, who holds a master's degree in social work from the University of Pennsylvania, receives an email message bearing the sad news that her former classmate, Anna, has died after a battle with Hodgkin's disease. Deb lives in Austin, Tex., making response difficult.

Internet Usage: As an educated member of Generation Y, Deb has long been proficient with common PC software (Word, Excel) and, of course, she surfs the Web.

Work, Friends and Family: A year earlier, Deb, a Midwestern native, moved to Austin with her boyfriend, a software programmer. Deb found work with a family services agency, a job that demands a great deal of time and emotional energy. Her boyfriend's work and circle of friends fascinate her, and she is contemplating a career change.

Several factors are transforming Deb's view of the world: her exit from college, the growing commitment between her and her boyfriend, the natural but transformed attachment to family as a young adult, her move to Austin with its subsequent building of adult relationships and her interest in a new career. Despite these changes, the news of Anna's death at such a young age affects Deb deeply, pulling her temporarily into the mindset of a 24-year-old graduate student again. She wants to attend the funeral, but in part, she's grateful that distance offers an excuse; the emotional tug-of-war between the old mindset and the new is a difficult one. The email message announcing Anna's Tribute on MyEtribute.com proves to offer the perfect path out of this dilemma.

Deb's Visit to MyEtribute.com

Deb keys the URL into her browser and goes right to Anna's Tribute page. Deb is suddenly awash in sadness and nostalgia. She sees a link to the Guest Book and goes there. The outpouring of sentiments from classmates, family and friends both reinforces Deb's sense of community with her classmates and Anna's family while also offering exactly the right way to participate Deb soon decides exactly what she will write, and she submits her entry to the Guest Book.

Deb sees the family has established a research find in Anna's name. Donations will eventually go to a Hodgkin's research center or the American Cancer Society, but the immediate donation is to the private family-sponsored fund, set up for tax-deductible donations. Deb is excited about the find, and clicks on the link to make an immediate donation. The Tribute to Anna was written in her parent and brother's names, but Deb knows the brother did most of the writing, uploading of photos and similar tasks. She also knows the brother will appreciate a sympathy e-greeting card. She chooses one from MyEtribute's wide selection.

Anna's Tribute includes several mentions of the family's Buddhist traditions, to which Anna and her brother only occasionally adhered. Deb feels a pang of anxiety: she may not know how to properly honor a Buddhist and respect the parents' beliefs. Deb sees a direct link to an FAQ document on Anna's specific Buddhist tradition and an essay by a respected theologian in MyEtribute's Religious and Cultural Database. She learns that in this version of Buddhism, the bereaveds are not to be contacted until after the funeral. She knows her e-mail to the brother was acceptable; he, too, is a member of Generation Y. Deb knows the parents would understand if she sent a card now, but she decides to wait. Deb makes a special trip to a gift shop to buy a beautiful card, writes a sincere message and puts the card aside to mail in a few days.

Deb's family practices Reformed Judaism, which Deb left in college but has been reconsidering. In her tradition, food baskets are considered respectful gifts. She is grateful to learn from MyEtribute's FAQ list that they are totally inappropriate for Anna's religious tradition—saved from a faux pas. Flowers are acceptable however, and since Deb cannot attend this emotional funeral in person, she sends a $100 bouquet.

Content: On the site, Deb sees several useful and interesting articles. While she won't have numerous reasons to visit either MyEtribute.com or any of the related sites, she does visit them when needed.

TABLE 7

Site Content to Keep Deb Returning to MyEtribute.com
and related site MyPettribute.com

| Story | Appeal for Deb, Long-Distance Mourner |
|---|---|
| Religious/Cultural Database | Anna knows this may be helpful in the future when other friends and acquaintances die. She also points out to her boyfriend that this could be especially useful for him, because he works with such a culturally diverse group (e.g., several |

TABLE 7-continued

Site Content to Keep Deb Returning to MyEtribute.com
and related site MyPettribute.com

| Story | Appeal for Deb, Long-Distance Mourner |
|---|---|
| | supervisors in his company are natives of India). |
| Special situations - death from tragic occurrences | Except for Deb's death, no tragic deaths have occurred to people close to Deb. However, she remembers a few suicides and accidents among peers who weren't close friends, so these articles provide food for thought. |
| Caring for yourself in this stressful time | The impact of stress on health is an important concept among young people. Deb is pleased to see this type of article and reviews it. |
| Talking to children about death | Intending to have a family someday, Deb finds this interesting. |
| FAQ and stories about the aging dog | Deb scans these stories but sends them on to her parents, who have a mature poodle. |

E-commerce: Initially, Deb buys an E-greeting sympathy card and flowers and makes a donation.

Viral Marketing from Deb's Visit to MyEtribute: Deb and her boyfriend are impressed with the site—the wide range of cards and flowers, the Religious and Cultural Database, and ideas about celebrating a life (rather than focusing on death), among other factors. Deb, contemplating a career change, clicks on "About MyEtribute"; as a Web-savvy social worker, she might be able to work for the company long-distance. In "About MyEtribute," Deb and her boyfriend see, in addition to job postings, links to MyPettribute.com.

The idea of a pet memorial site hits them as amusing until they visit the site. Tastefully done, with interesting articles on mature pet needs, the site appeals to them. They see Tributes posted for living as well as deceased pets. They make a mental note for the future, and mention both the MyEtribute and MyPettribute sites to family, friends and colleagues. Deb's acquaintances among social workers are especially interested. Some of her boyfriend's acquaintances think the sites are cool.

Over the next year, several purchases are made from visitors referred to the sites by Deb and her boyfriend. These include bulk purchases of sympathy cards from MyEtribute by the couple's parents and the parents' friends.

TABLE 8

MyEtribute.com Purchases Related to Death of Anna,
Former Classmate Of Deb, Long-Distance Mourner

| Item | Dollar Amount or Formula | Total |
|---|---|---|
| E-greeting | $1.95 | 1.95 |
| Flowers | 10% of 100.00 | 10.00 |
| Donation | 1.95 | 1.95 |
| GRAND TOTAL | | 13.90 |

TABLE 9

Viral Marketing: MyEtribute.com and MyPettribute.com Purchases
Over the Next 12 Months

| Item | Dollar Amount or Formula | Total |
|---|---|---|
| 50 cards (MyEtribute) | 10 @ 2.95 | 29.50 |
| 5 floral arrangements, avg. $50 (MyEtribute) | 10% of (5 @ $50) | 25.00 |
| 3 Basic Tributes for living pets (MyPettribute) | 3 @ $59.95 | 179.85 |
| 15 e-greetings (MyPettribute) | 15 @ $1.95 | 29.25 |
| GRAND TOTAL | | 263.60 |

As previously described, the inventive site will feature a wide variety of columns, articles, story logs, and other appropriate informational and editorial content. The following examples are non-inclusive illustrations of what a typical religious content page and a typical editorial content page of the inventive site or sites may contain, and are not meant to be limiting in any way:

Sample Religious Content Page

Catholic Beliefs, Practices and Customs Related to Mourning (Roman Catholic Church in the United States)

Overview: Roman Catholics' Beliefs About Death

The 2,000-year-old church, which became known as the Roman Catholic Church in the 1600s, holds life after death as a central belief. This life is not reincarnation—a return to earth in a different body and personality—but rather a resurrection, the joining of the immortal soul to an incorruptible body. This occurs through the love of God for man as ultimately expressed in the resurrection of Jesus Christ, second person of God the Holy Trinity (the Father, the Son and the Holy Spirit). Catholics believe resurrection will be either to glory for those who have repented for their sins or to judgment for those who have not. Central to Catholic practice is the service known as the Mass, or Celebration of the Mass, Celebration of the Eucharist and similar terms. At the heart of the Mass is Holy Communion (the Eucharist), transformation of bread and wine into the actual body and blood of the risen Christ. Regular Mass attendance is required of all Catholics with access to the service, so the importance of the Mass cannot be overstated. Many Catholic funerals include a Mass, with special prayers for the deceased.

How Quickly Should Mourners Respond?

Generally, the key elements of the remembrance—viewing, funeral service (Mass) and burial or cremation—occur within a week of the death, although no absolute rules exist. Mourners who want to send flowers to the funeral home should keep this timeframe in mind. Beyond the sending of flowers, expressions of sympathy may be made at any time. When memorial services are held, they tend to occur within a month of the death.

What Types of Gifts, Offerings and Communications are Appropriate?

Flowers are appropriate, especially if they are sent to the funeral home during the viewing period. Sympathy cards, letters and telephone calls are often welcome. Use of E-mail for sympathy communications will depend on the preferences of the family and significant others. Although gifts of food are acceptable, they are not standard. The exception is when the giver is helping ease the burden on the family during this busy time. Then, the gift is one of time more than food.

What Can Mourners Expect at the Visitation, Funeral and/or Memorial Service?

Visitation usually involves an open casket, but this depends on circumstances and the family's preferences. Visitation is usually held at a funeral home. Those attending are expected to approach the casket and pray silently (or observe a moment of silence); Catholics often kneel, but in general, non-Catholics are welcome to stand before the casket. After a silent prayer or moment, the attendees will be expected to express their sympathy directly to family members, especially if they are standing near the casket. Increasingly, visitations are held for part of one day rather than two. The evening before the burial, a Catholic priest or lay minister leads the praying of the Rosary, a series of general prayers, and also says specific prayers for the dead. This generally occurs over a 30-60 minute period. Many Catholics will kneel and speak all or some of the prayers; non-Catholics are expected to sit quietly during this time or participate if they feel comfortable.

The funeral service usually begins at the funeral home with prayers led by a priest or lay minister, continues in a hearse-led procession to a nearby church for a mass and brief eulogy, and ends at the cemetery, where prayers may be said over the casket in a chapel, at graveside or both. During prayers at the funeral home, non-Catholics are welcome to speak prayers aloud or stand or sit quietly. At the Mass, non-Catholics may participate as they feel comfortable except for Holy Communion (also called "the Eucharist"), which is open only to practicing Catholics. It is a notable violation of Catholic rules and beliefs for non-Catholics to take Communion. At other times during the Mass, standing, sitting and kneeling in concert with the attending Catholics is optional; kneeling, in particular, generally is not expected from non-Catholics. The same behavior is appropriate for cemetery chapel or graveside prayers.

How Should Mourners Dress for the Visitation, Funeral and/or Memorial Service?

There are no requirements regarding head coverings or other specific dress. As in other religions, U.S. believers have tended toward more casual apparel. In addition, the Church's inclusive attitude toward less fortunate individuals makes dress less of an issue, especially in urban churches. However, in general, those attending any type of ceremony in a Catholic Church should keep in mind the solemnity of the occasion and the respect many Catholics direct toward their sanctuary. Catholics believe that consecrated Communion bread (also called the Communion "host") is the actual body of the risen Christ, second person of the Holy Trinity, which comprises God. Consecrated hosts are usually housed in the tabernacle on the altar, thus making every church a true house of the Lord in the Catholic belief system.

Sample Editorial Content Page

Comforting the Bereaved: How You Can Help a Grieving Friend

How often we feel-helpless in the face of another person's pain. We cannot make the pain disappear, but we can help by providing a supportive presence and by taking on some practical chores. The following suggestions were gleaned from several sources:

Checklist for Support
1. As soon as you hear the news, contact the survivor and extend your support. Offer to make any calls he or she would like to delegate. Be prepared with a note-book and pencil to get things organized, including: Making sure the proper authorities have been called to care for the body; Listing everyone to be notified; Keeping track of visitors and their kind gestures; Jotting down household chores that must be attended to, including yard work, child care, meals and plant and pet care.
2. Encourage the survivor to rest and to eat.
3. Offer to drive the survivor to where he or she needs to go and to help arrange transportation for distant visitors.
4. Offer hospitality to visitors.
5. Help to prepare or package food for the family. Casseroles, vegetables and fruits are healthier than sweets and desserts. Tape the names of people who bring potluck dishes to the underside of the containers so they can be returned to the right people.
6. Give the survivor a ruled journal to keep with them.
7. Be ready to listen. The survivor may tell the same "story" over and over again. Be patient. Some survivors also may not feel like talking. Don't try to force them to.
8. Help gather material for the obituary, funeral service and memorial cards.
9. Offer to attend to the guest book at the funeral.
10. Get names and telephone numbers for other people who have offered to help.
11. Instead of saying, "call me to help," offer to do something specific such as "Would it help if I came over and vacuumed while you are at the mortuary?"
12. Arrange for someone to housesit during the funeral.
13. Offer to arrange for videotaping of the funeral.
14. See if the family would like funeral flowers delivered to a hospital or nursing home.
15. Make a map for visitors to the after-funeral gathering.
16. Help with thank you notes.
17. Continue to visit and call the family occasionally.
18. Help the survivors make up a memory book of cards and notes if they desire.

The present invention also contemplates the use of stories and story logs to assist users in gathering information and learning to cope with their loss. In general, all stories indirectly encourage readers to use MyEtribute and facilitate that usage. To those ends, stories will provide useful information from expert sources. Information and ideas in these stories will help readers become and feel more educated about topics related to the death of a loved one. This increased knowledge should help replace readers' negative ideas about funerals and related events with positive ones, allowing for greater participation in events and in the MyEtribute site. Stories are provided on a number of story channels, each of which may be dedicated to related general subject matters, including, for example, Coordinating Mourners, Mourners, and Planners. Each story channel contains one or more individual stories providing information to the user in a variety of formats such as, for example, anecdotal, Question and Answer, listings, and other well recognized formats to those skilled in the art. The following example is a non-inclusive illustration of a sample story log hierarchy of the inventive site, and is not meant to be limiting in any way. Other channels, topics, material, links, sources and contents may be added or rearranged as would be readily understood by one skilled in the art.

SAMPLE HUMAN STORY LOG HIERARCHY

| Story Topic | Sources | Key Points | Links To... |
|---|---|---|---|
| *Coordinating Mourners, Close Family, Significant Others* | | | |
| After a Loved One Dies: A Road Map for the Days Ahead | Hospital/hospice/nursing home expert; doctor; funeral director; counselor | Hospital or clergy can recommend a funeral home, who removes the body, how should a loved one be remembered, checklist of things to do | Planners (self, other) |
| When Death Occurs at a Distance | Funeral director; hospital, hospice and/or nursing home experts | Procedures, laws, costs and pitfalls related to the process of shipping a body | Planners (self, other) |
| Travel Tips and Discounts for Mourners | Funeral directors, travel agents | How to save on airfare; other reduced rates for mourners (e.g., hotels?); caring for self while traveling; what to say to others; more | Mourners Planners (others) |
| Advice from the Spotlight: How Celebrities Want to be Remembered | Notable public figures; counselors (authors) | Through celebrities and experts, communicate the value of remembrance through traditional and new approaches. | Planners (self, other) |
| Life Celebrations, Past and Future | Funeral directors, clergy, death and funeral consultants | Examples of interesting traditional and new approaches to remembrance | Planners (self, other) |
| Learning to Remember: The Path from Grief to Love | Notable public figures; counselors (authors) | Through celebrities and experts, communicate the value of a person's life, even in death. | Mourners Planners (self, other) |
| The Language of Hope: New ways to Think About Death and Grieving | Darcie Sims (grief expert, speaker at NFDA meetings) | How you think and talk about death affects the way you feel and how well you cope; new paradigm in which to view the grieving process | Mourners Planners (self, other) |
| Engaging the Cycle of Grief | Several counselors (authors) | Grief has a framework, a cycle; also, grief is as individual as each person; examples of working through grief; value of working through grief | Mourners Planners (self, other) |
| How Religion and Spirituality Can Help Those Who Stay Behind | Clergy, counselors | How religion/spirituality helps people understand and cope with death; acknowledge both organized religion, alternative beliefs | Mourners Planners (self, other) |
| Talking With a Child About Death | Counselors (authors) | How children often/usually react; responding to their reactions; what to say and how to say it; choosing a time to talk; more | Mourners Planners (self, other) |
| Understanding Violent Death | Clergy, counselors, funeral directors (police?) | Understanding violent death; "why does God allow it?"; dealing with anger, fear; determining what to say to others; caring for self and others; more | Mourners |
| When the Unthinkable Strikes: the Violent Death of a Child | Clergy, counselors, funeral directors (police?) | Special considerations in understanding violent death of a child; "why does God allow it?"; dealing with anger, fear; determining what to say to others; caring for self and others; more | Mourners |
| A Struggle Ends: The Tragedy of Death from Illness | Clergy, counselors, hospice, doctors, nurses | Understanding death from illness, whether extended or sudden; "why does God allow it?"; dealing with anger, fear; the question of, "is it better that s/he is no longer suffering?"; determining what to say to others; caring for self and others; more | Mourners Planners (self; other) |
| When Illness Takes a Child (Special situations - illness: child's death) | Clergy, counselors, hospice, doctors, nurses | Special considerations in understanding the untimely death of a child from illness; "why does God allow it?"; dealing with anger, fear; determining what to say to others; caring for self and others; more | Mourners Planners (self; other) |
| *Mourners* | | | |
| Comforting the Bereaved | Counselors (authors), clergy; may include notable public figures | What to say, what to do, understanding another's intense emotions, caring for self, more | |
| The Spiritual Mourner | Clergy, counselors (authors); may include notable public figures | The power of prayer, the role of spiritual insights, varied views on death, more | |
| Doing What's Right: Proper Gifts and Etiquette | Counselors (authors), clergy; may include notable public figures | Appropriate flowers, when are food gifts appropriate, other appropriate gifts, how to express sentiments, proper dress, more | Planners (Self and Others) |
| Lessons from the Experts: Supporting the Bereaved | Funeral directors and clergy | Insights from "behind the scenes" experts: what major gaffes have they seen that could be avoided, what special kindnesses are helpful, advice for mourning someone from a different culture, more | Planners (Self and Others) |
| *Planners for Self and Others* | | | |
| Physical Changes When the End is Near | Doctors, hospice, hospital, nursing home | Pain relief options, medical tests, physical changes that occur over a short period of time, more | Planners (Others) |
| After the Hospice, Hospital or Nursing Home | Doctors, hospice, hospital, nursing home, funeral directors, lawyers | How the body is removed, where it is taken, who signs the death notice, more | Planners (Others) |
| When a Loved One Dies At Home | Doctors, funeral directors, paramedic | Whom to call first, how is body removed, where taken, working | Planners (Others) |

-continued

SAMPLE HUMAN STORY LOG HIERARCHY

| Story Topic | Sources | Key Points | Links To... |
|---|---|---|---|
| | experts | with clergy and funeral directors, more | |
| Taking Care of Yourself | Counselors (authors) | Understanding and coping with feelings before and immediately following death of loved one, physical needs (e.g., diet, exercise), help from counselors and clergy, more | Coord. Mourners Planners (Others) |
| New Paths to Remembrance | Funeral directors, clergy, counselors (authors) | Memorialization shouldn't have a "cookie cutter approach" but be personalized; specific ideas from those on the cutting edge | Planners (others) |
| A Primer on Pre-need and Insurance | Lawyers, funeral directors | Insurance, other arrangements, sources of pre-need arrangements (e.g., funeral directors), questions to ask, what types of professionals to consult | Planners (others) |
| Protecting Your Estate | Estate planners (lawyers) | Wills, DNR, trusts, executors, power of attorney, more | Planners (others) |
| What to Ask Your Lawyer | Estate planners (authors) | Questions to ask one's lawyer about estate planning; basic categories of concerns | Planners (others) |
| Do It Yourself: Create Your Own Remembrance | Counselors (authors), clergy, funeral directors | Memorialization is the way people will remember you; traditional format is a "cookie-cutter" approach, and new options for personalization are acceptable and available; examples of new approaches | Planners (others) |
| Discussing Your Plans With Those You Love | Counselors (authors), clergy, lawyers (authors), funeral directors | How to present a plan to your spouse, family members or significant other, predicting others' reactions, withholding discussion, letting others plan for you | |
| Are Your Last Wishes Serving Your Needs? | Lawyers and counselors (authors) | Think twice about the plans you make, seek and fairly weigh experts' advice, more | Planners (others) |
| What's the Best Place to Die? | Hospice, hospital, nursing home execs or doctors; lawyers; | Different features and benefits of hospices, hospitals, nursing homes, personal home, assisted living | Planners (others) |
| The Hardest Conversation | Counselors (authors) | How to initiate a discussion, predicting how others will react, how much planning can be done when the other can't or won't discuss, more | |

As previously described, the inventive web site features a wide variety of offerings to those mourning the passing of both human loved ones and pets, including sympathy, announcement, tribute and acknowledgement cards, full tributes, messages, shopping, education and gathering of information. Examples of specific offerings include, but are not limited to, the following items, which are made available to users at prices to be determined by the site administrator.

Sympathy cards may be ordered and sent in either electronic or paper form, and are priced accordingly. An electronic card may be a simple e-mail message or may contain a URL link within the message, and is sent to one or more individuals as designated by any mourner, and in particular a coordinating mourner. Cards may be sent by others and to others as well. Electronic cards may include the same graphic or design as a paper printed version of the cards, or such an image may be simplified as necessary. Sympathy cards may be religious or non-religious in nature, and many versions of cards may exist for any particular category or religion. Examples include, but are not limited to, Protestant, Catholic, Jewish, Hindu, Non-Denominational and other types of cards. Custom-made religious cards are also available. Non-religious sympathy card categories may include, but are not limited to, General Sympathy, Corporate, New Age and others. Sympathy cards are also available for cats, dogs and other pets and animals. Paper sympathy cards may come with matching envelopes, and can be mailed to standard postal addresses as elected by the sender.

Announcement cards may also be ordered and sent in either electronic or paper form, and are priced accordingly. While announcement cards will typically be ordered and sent by a coordinating mourner, these cards may also be sent by anyone and to anyone as well. As for the sympathy cards, electronic announcement cards may be a simple e-mail message or may contain a URL link within the message. Such an announcement card will typically announce an established tribute web page if one has been established, and as in the sympathy cards, an electronic announcement card may include the same graphic or design as a paper printed version of the cards. Announcement cards may be religious or non-religious in nature, and many versions of cards may exist for any particular category or religion. Examples are the same as for the sympathy cards.

Acknowledgement cards may also be ordered and sent in either electronic or paper form, and are also priced accordingly. These cards may be used to thank and/or acknowledge the thoughtfulness of another, for example for sending flowers or creating a guestbook entry or online tribute, and may also be sent by anyone and to anyone as well. As for the sympathy and announcement cards, electronic acknowledgement cards may be a simple e-mail message or may contain a URL link within the message. Such acknowledgement cards may be religious or non-religious in nature, and many versions of cards may exist for any particular category or religion. Examples are the same as for the sympathy and announcement cards.

Tribute cards an are also made available under the present invention. Tribute cards may comprise a short tribute, for example, a small white card, with text from a standard basic or customized tribute as desired. Programs may include, for example, the obituary, memorial information and other specific program information, as well as text passages as desired. A specific URL and/or a message from the coordinating mourner may also be included with either type of offering. As for the sympathy, announcement and acknowledgement cards, tribute cards and programs may also be ordered and sent in either electronic or paper form, and are also priced accordingly. In the case of any of the paper sympathy, announcement, acknowledgement or tribute cards or programs, special options may be selected for formal stationary, calligraphy, hand-stamped envelopes, and the like, and extra charges may be added accordingly.

Full tributes may be made by any user and can be done either in paper or electronic form or both, and may be either basic or customized in nature. As for other offerings under the present invention, password protection may be utilized such that only a particular user or users may make future additions or deletions to specific tributes. Tributes are posted for a set time period, for example three months, and may be renewed as desired by the user for additional cost. Users may elect to have courtesy reminders sent to them alerting them to upcoming expirations. Macros or templates are made available for creating any type of tribute, with a wider variety being made available to users that select a more customized package.

A word and image limit may exist for any type of tribute, with extensions available for an added charge. The overall cost of a tribute is reflected in the level of customization. A low cost basic tribute, for example, would be a basic tribute whereby the user requires no assistance for writing text or scanning images, and uploads or enters all data to be used to the web site. Conversely, higher cost custom tributes provide additional macros and templates beyond those for basic tributes, and the user may also utilize service assistance by staff members for things such as writing, photo downloading, and photo scanning. Customized tribute assistance may be charged to the user either through an hourly rate or a set fee for specified services. Additional "a la carte" items may also be ordered for any type of tribute, and these items include, for example, extra blocks of text (increased word limit), additional images (increased image limit), virtual candles and candleholders, and threaded discussions.

A user may also elect to create a specialized type of tribute or tributes that would be featured prominently and would remain posted for a lengthy period of time, for example ten years. Such a "Greener Pastures" type of tribute would involve additional cost, and would be featured at special areas on the inventive web site outside the specified area for the mourned individual or pet. As in the case of other tributes, a user could elect to renew a Greener Pastures Tribute upon its expiration and courtesy reminders may be sent in advance to notify of this option.

Similarly, basic and customized eulogy offerings are provided at the inventive web site under the present invention. For basic eulogies the user could construct a completely original eulogy or select a "Eulogy Tutorial," which allows the user to input specific information into one of several templates provided at the site. For an additional charge, users can opt for customized assistance, whereby staff members would write a specialized eulogy as directed and desired by the user. The variety of options for eulogies are substantially similar to those in the case of the full tributes above, and additions and a la carte items may be selected by the user as desired.

A guestbook can also be made available to visitors to the site, with free text entries to a certain word limit. As in the case of full tributes and eulogies, entries in excess of this word limit would then incur an additional charge. Standard macros and templates would be made available for this guestbook, which would remain posted for a set time period with renewal options. As for tributes and eulogies, courtesy renewal reminders may be provided and password protection could be selected for purposes of future edits or deletions. While promotional items, such as a free number of tribute cards or a free virtual candle and candleholder, for example, may be linked to any of the offered services, ties to guestbook use may be particularly advantageous to encourage future use by visitors.

Publication contacts may be selected by a user, and in particular the coordinating mourner. Newspaper contacts may also be selected, with a set fee, in addition to any newspaper charge, for distribution of a set obituary to any number of newspapers. Verification of the published obituary or an actual newspaper containing the obituary may also be had for a small fee. Other publication contacts may include a variety of magazines, such as alumni magazines, or online bulletin services. A preparedness dossier is another offering that is available to all users, but in particular to coordinating mourners, primary organizers and the like.

Flower delivery to any individual or group may also be conveniently selected by any user at the inventive site. Most any kind of arrangement or style may be selected, such as simple church or coffin arrangements, sprays, wreaths, anniversary or sympathy style arrangements, or single flower corsages or setups, as in the case of a celebrity memorial. Donations may also be made as desired to a specific group, individual or designated charity, and the inventive site would process such a donation for a small fee.

A Memory Book comprising part or all of a specific tribute web site, including all pages and ancillary items, may also be ordered. This Memory Book compiles a deluxe printed version of all tributes, all guestbook additions, and every ancillary item into one book as a keepsake. Although there is a set fee for such a book, excessive length in a particular tribute site may incur an additional charge if the entire site is desired. Items such as the Memory Book may be laminated, framed, and/or encased if so desired. These services may also be used for any type of card or other offering ordered on paper. Other customized offerings include, for example, Anniversary Reminders, Engraved Bricks, Monuments, Do-it-yourself Marker Kits, and in the event of pets, Pet Burial Pouches and Designer Urns. Such items may also be laminated, lucited, or encased as desired.

Another objective of the present invention is to provide one destination to efficiently plan, create, store, update and implement milestone-specific information for coordinating mourners and discrete mourning communities to assist in efficiently mourning the passing of celebrities, famous people, and other VIPs. According to another particularly preferred embodiment of the present invention, death related transactions and tributes for deceased celebrities, famous people and other VIPs may be conducted at several computer network locations or web addresses, or alternatively at a particular one-stop Internet site or brand such as, for example, www.VIPtribute.com. According to the present invention, VIPtribute.com is substantially similar to the embodiment under MyEtribute.com and combines, among other activities, tributes, messages, shopping, education and gathering of information into a single one-stop web site that offers a more convenient forum with which to conduct death related transactions for celebrities, famous people and other VIPs.

Under the VIPtribute.com brand of the present embodiment, the present invention utilizes the Internet to facilitate mourning of famous or important individuals. All of the offerings and services provided under MyEtribute.com may be utilized under this preferred embodiment, as well as a broader array of services designed to involve the myriad of admirers, well-wishers, and the public at large that may wish to memorialize celebrities and other VIPs. VIPtribute.com thus augments MyEtribute.com, with both web sites preferably having links to and promoting each other. This preferred embodiment likewise offers services such as death notices, obituaries, information, wishes, donations, distributions, guestbooks and various types of cards acknowledgments.

The augmenting VIPtribute.com aspect of the present invention offers a service for publicists that is both an audience driver and a revenue generator. This service creates and posts web pages on the MyEtribute.com site for public figures at the time of their deaths under the linked site VIPtribute.com. The content staff gathers information and photos, writes stories, creates web pages and forwards stories and photos directly to a custom list of news operations as well as over an obituary newswire service. Celebrities' publicists may receive this service free of charge in some cases, particularly where the benefit is returned in increased attracted audiences. Conversely, others such as corporate publicists or minor celebrity publicists may be charged a fee for the service, thus generating further revenue for the invention. Celebrity death announcements, stories on dramatic newsworthy events and corporate tributes are generally to be open to the public and viewing will be free, enabling the purchase of flowers and virtual candles by the public. Of course, this is mostly likely to occur for celebrity and other newsworthy deaths, rather than for corporate tributes.

For a typical VIP tribute on the inventive site, a Personal Representative facilitates an Extensive Tribute Page with unlimited photos and text. Distribution of the site address is made to the publicist's custom list of news outlets upon the VIP's death. The VIP Tribute Page comes with several promotional items, which may include, for example, free threaded discussion, free chat area, free virtual candles and candleholders, free virtual cards and free acknowledgements. In one embodiment, a VIP Tribute would be free for celebrities, but have a set price for corporate executives, for example $995.00.

The invention also offers newsrooms a service providing timely text and photos of deceased public figures as well as related feature stories. News of public figures comes, in part, from the invention's business-to-business service for publicists. Several value-added elements make the service attractive to both small and large news operations. Through VIPtribute.com, the inventive web sites develop a community for online mourning of celebrities, dignitaries, other notable individuals and everyday people caught in tragic events. VIPtribute.com features other key audience drivers as well, including a comprehensive description of mourning practices for different religions, new ideas for funeral planning and advice on travel and other basic needs during a time of bereavement.

In addition to the consumer products and services to be offered by MyEtribute.com and VIPtribute.com, there are also substantial business-to-business opportunities contemplated under the present invention. By way of example, one way to partner with funeral home directors to ensure a flow of new site users is by offering funeral directors a percentage of all revenue they direct to the site. Building on initial such relationships, products may then be offered that the funeral director can provide directly to his or her customers under the present invention. In addition, revenues to newspapers may be increased by giving users a choice of newspapers for listing the obituary and providing links to obituaries from newspapers throughout the country.

In conjunction with the MyPettribute.com brand, services under the brand VIPtribute.com may be linked for the instances of famous or important pets. Again, audience drivers are significant, and may be in many forms including, for example, pet celebrity tributes, information on pet maturity and pet news of interest. VIPtribute.com is designed to attract users via the online mourning of a celebrity pet, for example, and many will be directed to the MyPettribute.com site. This site will then continue to serve pet owners and their friends who want to care for maturing animals and then, finally, memorialize the passing of a loved companion animal.

Another objective of the present invention is to provide one destination to efficiently collect, store, update and review DNA for people and their pets. According to another particularly preferred embodiment of the present invention, the present invention offers DNA collection, processing, storage and analysis services for human and pet DNA, all of which may be conducted at several computer network locations or web addresses, or alternatively at a particular one-stop Internet site or brand such as, for example, www.DNAtribute.com. According to the present invention, DNAtribute.com combines, among other activities, the collection, storage, review, analysis, education and gathering of DNA and related information into a single one-stop web site that offers a more convenient forum with which to conduct DNA related transactions.

The invention offers a service of collection and storage of DNA for a fee. The invention links with those that do DNA analysis, and is an addition to both the human and pet sites disclosed above. Revenue from business-to-business enterprises will also be generated by this embodiment of the present invention, and under a separate brand such as ProTribute.com, it is possible to develop and market specialized products and services to many industries, such as the DNA analysis industry. Additional sources of revenue include advertising and donation-related fees. The inventive site may list, for example, all major charities with donation information, and users may make a donation online for a fee. The family receives a notification of the donation and the user receives the federally mandated tax documentation. The site may also carry, for example, regional advertising so that users can access information specific to their needs. National advertisers may include prominent companies associated with the mapping and analysis of the human genome. Some of these corporations may also represent strategic partnering opportunities under the present invention.

Informative content at the site includes background and detailed DNA information, with example topics being: famous DNA discoveries, uses of DNA, collecting and storing DNA, genetic diseases, genetic predispositions, DNA and the big killers, bacteria/viruses and DNA, racial & ethnic diseases, famous people, famous mysteries solved, careers in genetics, DNA and the animal kingdom, DNA and the plant kingdom, and organ and cell donation. Examples of interactive content at the site include: DNA in the News, Children's Corner—Dr. Denny Dino, Leading DNA Companies and Organizations, and DNA Legal/Privacy Issues. "Action Content" pages include specific information for parents, pet owners, farmers, bereaved individuals, and people with diseases or disorders.

In a community-oriented context, additional content includes free postings regarding missing children, missing pets, rare disorder groups, and donor alerts. Products available at the site include, among other items, individual kits and multi-packs, arranging analyses, specialty products, and products for professionals. Available services include newsletters, analysis alerts, clinical trial alerts, DNA charts and pages, and hosted storage services. Advertising and sponsorships can be made available for many types of entities, including the following examples:

Pharmaceutical, animal health and medical products companies
Disease specific societies and charities
Clinical trial and research organizations
Genealogy organizations
Breeders organizations and services Insurance and planning
Healthcare Plans
Specialty products—tags, bracelets, safes
Specialty services—photographers
Publications
Professionals (vets, genetic counselors, etc.)

Strategic partnering may include customer database or contacts services, e-health synergy, genetic database or contacts services, research companies, and other outreach services.

The present invention fits a true consumer need, and generates numbers as a result of being fed by other sites, along with consumer advertising. It is aimed at the right target population, primarily tech savvy individuals as well as families. It is not aligned with any healthcare, payer or government infrastructure, and is positioned for productive dialogue. In sum, the present invention operates at the interface of science and consumerism. It is designed to deliver the right skill mix and media, and is positioned for the latest advances in software and biotechnology. Under the present invention brands are established upon which the customer can trust and depend. Site content, all forms of consumer communication and customer interaction add value to these brands. Technology and design decisions support brand values through ease-of-use and customer friendliness. According to the present invention, special advisory and consulting groups are utilized to help assure accurate interpretation of emerging consumer trends. The invention contemplates corporate identification, and registration strategy has been designed to accelerate the brand-building process for, among others: MyEtribute.com, MyPettribute.com, VIPtribute.com, Protribute.com and Tributewire.com.

Although the foregoing invention has been described in some detail by way of illustration and example for purposes of clarity and understanding, it will be recognized that the above described invention may be embodied in other specific forms without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of conducting pet related transactions over the Internet, comprising:
    (a) providing at least one computer server which hosts one or more Internet web sites containing multiple sources of pet-related information and services, said at least one computer server capable of starting a client session, sending a command to start a client program, receiving commands from a remote computer, passing commands to a software session, and transmitting data to a remote computer; wherein said pet related services include a pet calculator that prompts specific input from a remote user, analyzes at least a portion of said input, and provides results and feedback to the remote user based on at least a portion of said input;
    (b) permitting remote users to establish accounts, whereby said remote users may obtain information regarding to or place orders for pet-related services from a plurality of associated sources and vendors and said account permitting said user to access to portions of said computer server via a protected password;
    (c) permitting said remote users to start a client session by sending a command and receiving a response of said command from said remote computer;
    (d) permitting said remote user to provide input to said pet calculator regarding a specific pet and receiving feedback information from said server addressing the needs of the specific pet, based at least in part on analysis of said input; and
    (e) charging said remote users via their established accounts for obtaining information regarding or to place orders for pet-related services from a plurality of associated sources and vendors.

2. The method of claim 1, wherein said computer sever further hosts one or more interactive information columns which may be separately accessed by said remote users.

3. The method of claim 1, wherein said remote server further provides access to said plurality of associated sources and vendors through a private entrance.

4. The method of claim 1, wherein said pet related transaction, information, and services pertain to the death of a famous or an important individual's pet.

5. The method of claim 1, wherein at least one portion of said results and feedback contains at least a portion of said specific input while at least another portion of said results and feedback contains standardized genetic passages that do not contain any of said specific input.

6. The method of claim 1, wherein said results and feedback from said pet calculator comprises a pet profile providing information and recommendations specific to said pet.

7. The method of claim 6, wherein said pet calculator combines at least a portion of said input with set parameters for various species and breeds of pets before providing customized results and feedback to the remote user based on said input.

8. The method of claim 1, wherein said pet calculator divides animals into a plurality of age classifications, assigns one or more specific age classifications to a particular pet based upon said specific input, and provides results and feedback to the remote user based upon said one or more assigned age classifications.

9. The method of claim 1, wherein said pet related services include further comprising a pet selector, whereby said pet selector prompts specific input from a remote user, analyzes at feast a portion of said input, and provides customized recommendations on pet selection to the remote user based on at least a portion of said input.

10. The method of claim 9, wherein said pet selector provides recommendations as to specific species and breeds of pets based upon one set of specific input.

11. A method of conducting pet-related transactions over the Internet, comprising:
    (a) providing at least one computer server for hosting one or more Internet web sites containing pet-related information and services, said at least one computer server capable of starting a client session, sending a command to start a client program., receiving commands from a remote computer, passing commands to a software session, and transmitting data to a remote computer, wherein said pet-related services include a pet calculator that prompts specific input from a remote user, analyzes at least a portion of said input, and provides results and feedback to the remote user based on at least a portion of said input, and wherein said pet related services also include a pet selector, whereby said pet selector prompts specific input from a remote user, analyzes at least a portion of said input, and provides customized recommendations on pet selection to the remote user based on at least a portion of said input;

(b) permitting remote users to establish accounts, whereby said remote users may obtain information regarding pet-related services or order pet-related services from a plurality of associated sources and vendors; and (c) charging said remote users via their established accounts for obtaining information regarding or ordering pet-related services from a plurality of associated sources and vendors.

12. The method of claim 11, wherein at least a portion of said pet-related information or services are provided by outside vendors in business partnerships with the proprietor of said at least one computer server.

* * * * *

UNITED STATES PATENT AND TRADEMARK OFFICE
CERTIFICATE OF CORRECTION

PATENT NO. : 7,671,751 B2
APPLICATION NO. : 10/001420
DATED : March 2, 2010
INVENTOR(S) : Katharine Russell et al.

It is certified that error appears in the above-identified patent and that said Letters Patent is hereby corrected as shown below:

At column 36, line 22, replace "genetic" with "generic"

At column 36, line 42, replace "feast" with "least"

At column 36, line 55, delete the "." after "program"

Signed and Sealed this

Fourteenth Day of December, 2010

David J. Kappos
*Director of the United States Patent and Trademark Office*